(12) United States Patent
Goeringer et al.

(10) Patent No.: US 11,941,588 B2
(45) Date of Patent: Mar. 26, 2024

(54) SYSTEMS AND METHODS FOR BLOCKCHAIN VIRTUALIZATION AND SCALABILITY

(71) Applicant: CABLE TELEVISION LABORATORIES, INC, Louisville, CO (US)

(72) Inventors: Steven John Goeringer, Westminster, CO (US); Brian Alexander Scriber, Denver, CO (US); Robert Michael Lund, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 324 days.

(21) Appl. No.: 15/476,111

(22) Filed: Mar. 31, 2017

(65) Prior Publication Data

US 2017/0337534 A1 Nov. 23, 2017

Related U.S. Application Data

(63) Continuation-in-part of application No. 15/376,375, filed on Dec. 12, 2016, now abandoned, which is a
(Continued)

(51) Int. Cl.
*G06Q 20/02* (2012.01)
*G06Q 20/06* (2012.01)
(Continued)

(52) U.S. Cl.
CPC ............ *G06Q 20/02* (2013.01); *G06Q 20/06* (2013.01); *G06Q 20/123* (2013.01);
(Continued)

(58) Field of Classification Search
CPC .... G06Q 20/1235; G06Q 20/02; G06Q 20/06; G06Q 20/123; G06Q 20/3827;
(Continued)

(56) References Cited

U.S. PATENT DOCUMENTS 6,226,618 B1 5/2001 Downs et al.
6,601,172 B1 7/2003 Epstein
(Continued)

FOREIGN PATENT DOCUMENTS

WO 2017027648 A1 2/2017

OTHER PUBLICATIONS

Adam Back, et al., Enabling Blockchain Innovations with Pegged Sidechains, Oct. 22, 2014, pp. 1-25 (Year: 2014).*

*Primary Examiner* — Nilesh B Khatri
(74) *Attorney, Agent, or Firm* — Josh C. Snider; Snider IP

(57) ABSTRACT

A virtualized blockchain forest includes a plurality of individual blockchains. Each individual blockchain of the plurality includes a blockchain height, a genesis block, and at least one additional block. The virtualized blockchain forest further includes a plurality of participating processors that make up a consensus pool, and a blockchain forest height having a time-sequenced start-to-finish length of blocks among the collective plurality of individual blockchains. The virtualized blockchain forest is configured to aggregate different ones of the plurality of individual blockchains, and is further configured to terminate individual ones of plurality of individual blockchains.

16 Claims, 28 Drawing Sheets

Related U.S. Application Data continuation-in-part of application No. 15/345,411, filed on Nov. 7, 2016.

(60) Provisional application No. 62/315,835, filed on Mar. 31, 2016, provisional application No. 62/266,592, filed on Dec. 12, 2015, provisional application No. 62/252,097, filed on Nov. 6, 2015.

(51) Int. Cl.

| | | |
|---|---|---|
| *G06Q 20/12* | (2012.01) | |
| *G06Q 20/38* | (2012.01) | |
| *G06Q 20/40* | (2012.01) | |
| *G06Q 50/18* | (2012.01) | |
| *H04L 9/06* | (2006.01) | |
| *H04L 9/32* | (2006.01) | |
| *H04L 9/40* | (2022.01) | |
| *H04W 12/03* | (2021.01) | |
| *H04W 12/04* | (2021.01) | |
| *H04L 9/00* | (2022.01) | |

(52) U.S. Cl.
CPC ..... *G06Q 20/1235* (2013.01); *G06Q 20/3827* (2013.01); *G06Q 20/3829* (2013.01); *G06Q 20/401* (2013.01); *G06Q 50/184* (2013.01); *G06Q 50/188* (2013.01); *H04L 9/06* (2013.01); *H04L 9/3239* (2013.01); *H04L 63/0428* (2013.01); *H04L 63/06* (2013.01); *H04W 12/03* (2021.01); *H04W 12/04* (2013.01); *G06Q 2220/00* (2013.01); *H04L 9/50* (2022.05); *H04L 2209/56* (2013.01); *H04L 2209/603* (2013.01); *H04L 2463/102* (2013.01)

(58) Field of Classification Search
CPC ............ G06Q 20/3829; G06Q 20/401; G06Q 50/184; G06Q 50/188; H04L 9/3239; H04L 63/0428; H04L 6/06; H04W 12/02; H04W 12/04

See application file for complete search history.

(56) References Cited

U.S. PATENT DOCUMENTS

| | | | |
|---|---|---|---|
| 8,639,625 B1 | 1/2014 | Ginter et al. | |
| 9,300,678 B1 | 3/2016 | Stack et al. | |
| 10,586,062 B1 * | 3/2020 | Rangan | G06F 21/6209 |
| 10,826,685 B1 * | 11/2020 | Campagna | H04L 9/3239 |
| 11,514,448 B1 * | 11/2022 | Liberman | G06Q 20/3829 |
| 2003/0084306 A1 | 5/2003 | Abburi et al. | |
| 2005/0038724 A1 * | 2/2005 | Roever | G06Q 20/12 |
| | | | 705/35 |
| 2006/0036864 A1 | 2/2006 | Parulski et al. | |
| 2006/0053232 A1 | 3/2006 | Onoda et al. | |
| 2006/0122946 A1 | 6/2006 | Fahrny et al. | |
| 2007/0283158 A1 | 12/2007 | Danseglio | |
| 2008/0046755 A1 | 2/2008 | Hayes | |
| 2008/0065552 A1 | 3/2008 | Elazar et al. | |
| 2008/0216106 A1 | 9/2008 | Maxwell et al. | |
| 2010/0088522 A1 | 4/2010 | Barrus et al. | |
| 2011/0184910 A1 | 7/2011 | Love et al. | |
| 2011/0202687 A1 | 8/2011 | Glitsch et al. | |
| 2012/0155643 A1 * | 6/2012 | Hassan | H04L 63/065 |
| | | | 380/270 |
| 2014/0067577 A1 | 3/2014 | Tucker | |
| 2014/0089264 A1 * | 3/2014 | Talagala | G06F 11/1471 |
| | | | 707/649 |
| 2015/0161153 A1 | 6/2015 | Gheith et al. | |
| 2015/0262137 A1 | 9/2015 | Armstrong | |
| 2015/0278820 A1 | 10/2015 | Meadows | |
| 2015/0379510 A1 | 12/2015 | Smith | |
| 2016/0098723 A1 | 4/2016 | Feeney | |
| 2016/0321434 A1 | 11/2016 | McCoy et al. | |
| 2016/0321751 A1 * | 11/2016 | Creighton, IV | G06Q 40/04 |
| 2017/0005804 A1 | 1/2017 | Zinder et al. | |
| 2017/0031676 A1 | 2/2017 | Cecchetti et al. | |
| 2017/0046651 A1 * | 2/2017 | Lin | H04L 9/3247 |
| 2017/0116693 A1 | 4/2017 | Rae et al. | |
| 2017/0126702 A1 | 5/2017 | Krishnamurthy | |
| 2017/0134161 A1 | 5/2017 | Goeringer et al. | |
| 2017/0230353 A1 * | 8/2017 | Kurian | G06Q 20/40 |
| 2017/0279783 A1 | 9/2017 | Milazzo et al. | |
| 2018/0114218 A1 * | 4/2018 | Konik | G06Q 20/382 |
| 2018/0130034 A1 * | 5/2018 | Taylor | G06Q 20/02 |
| 2018/0173719 A1 * | 6/2018 | Bastide | G06F 40/166 |
| 2018/0198624 A1 * | 7/2018 | Bisti | H04L 9/3239 |
| 2018/0218003 A1 * | 8/2018 | Banga | G06F 16/162 |
| 2018/0276626 A1 * | 9/2018 | Laiben | G06Q 20/3829 |

\* cited by examiner

SYSTEMS AND METHODS FOR BLOCKCHAIN VIRTUALIZATION AND SCALABILITY

CROSS REFERENCE TO RELATED APPLICATIONS

This application is a continuation-in-part of U.S. patent application Ser. No. 15/376,375, filed Dec. 12, 2016, which claims the benefit of and priority to U.S. Provisional Patent Application Ser. No. 62/266,592, filed Dec. 12, 2015. U.S. patent application Ser. No. 15/376,375 is a continuation-in-part of U.S. patent application Ser. No. 15/345,411, filed Nov. 7, 2016, which claims the benefit of and priority to U.S. Provisional Patent Application Ser. No. 62/252,097, filed Nov. 6, 2015. This application further claims the benefit of and priority to U.S. Provisional Patent Application Ser. No. 62/315,835, filed Mar. 31, 2016. The respective disclosures of all of these applications are incorporated by reference herein in their entireties.

BACKGROUND

The field of the disclosure relates generally to network transaction security systems, and more particularly, to mechanisms for virtualization and scalability using blockchain technology.

A large amount of transactions performed over a network are not considered to be secure, and conventional transaction security solutions can be extremely complex. Moreover, conventional mechanisms for transaction security that may be considered secure at the present are likely to be considered less secure in the future as new exploitation techniques are discovered. When one security for a transaction has been breached, it can be especially difficult to prove that the transaction itself was compromised, or when the compromise occurred.

Blockchaining technology takes transaction information, encapsulates it in a digital envelope or "block" and then the block is cryptographically added (using cipher chaining techniques) to the end of a chain of other transactions. This cryptographic addition incorporates information from prior blocks on the chain to calculate the digital chain or "hash" for this new block. The calculations for cryptographic addition can vary widely in complexity based on the rules of the blockchain. This complexity is purposeful though, in order to prevent modification of the existing blockchain to which is being added. That is, in order to modify an earlier block in the chain, the entire chain from that point forward would need to be recalculated. It is through this technique that the immutability of the chain, and permanency of its public ledger, is maintained.

The blockchain is a core component of the digital currency bitcoin (sometimes referred to as "crypto-currency"), where the blockchain serves the public ledger for all transactions. Bitcoin transactions allow every compatible client to connect to a network, send transactions to the network, verify the transactions, and compete to create blocks of the blockchain. The bitcoin transaction, however, involve only the exchange of currency between client and the network. Bitcoin transactions to not involve transactions and negotiations between two individual clients directly, and bitcoin clients do not transfer content beyond the currency value itself. Customers and users of media service providers, on the other hand, are increasingly sharing access to media services between each other. A common form of such access sharing is exhibited where two customers and/or users share account credentials (logon IDs and passwords) between one another. In the cable industry, this type of sharing is often referred to as "cord cheating."

BRIEF SUMMARY

In an aspect, a virtualized blockchain forest includes a plurality of individual blockchains. Each individual blockchain of the plurality includes a blockchain height, a genesis block, and at least one additional block. The virtualized blockchain forest further includes a plurality of participating processors that make up a consensus pool, and a blockchain forest height having a time-sequenced start-to-finish length of blocks among the collective plurality of individual blockchains. The virtualized blockchain forest is configured to aggregate different ones of the plurality of individual blockchains, and is further configured to terminate individual ones of plurality of individual blockchains.

In another aspect, a method of establishing a lifecycle of a blockchain in a virtualized blockchain forest is provided. The virtualized blockchain forest includes a first processor, an observer node, and a broker node. The method includes steps of initiating a genesis transaction to the first processor, the genesis transaction defined by a set of user-specified requests, creating, by the first processor, a genesis block to instantiate the blockchain, adding, by the first processor, at least one additional block to the blockchain, monitoring, by the observer node, a status of the blockchain, alerting, by the observer node, the broker node of a change in status of the blockchain, and determining, by the broker node, an action on the blockchain based on the alert from the observer node.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Figure 1:
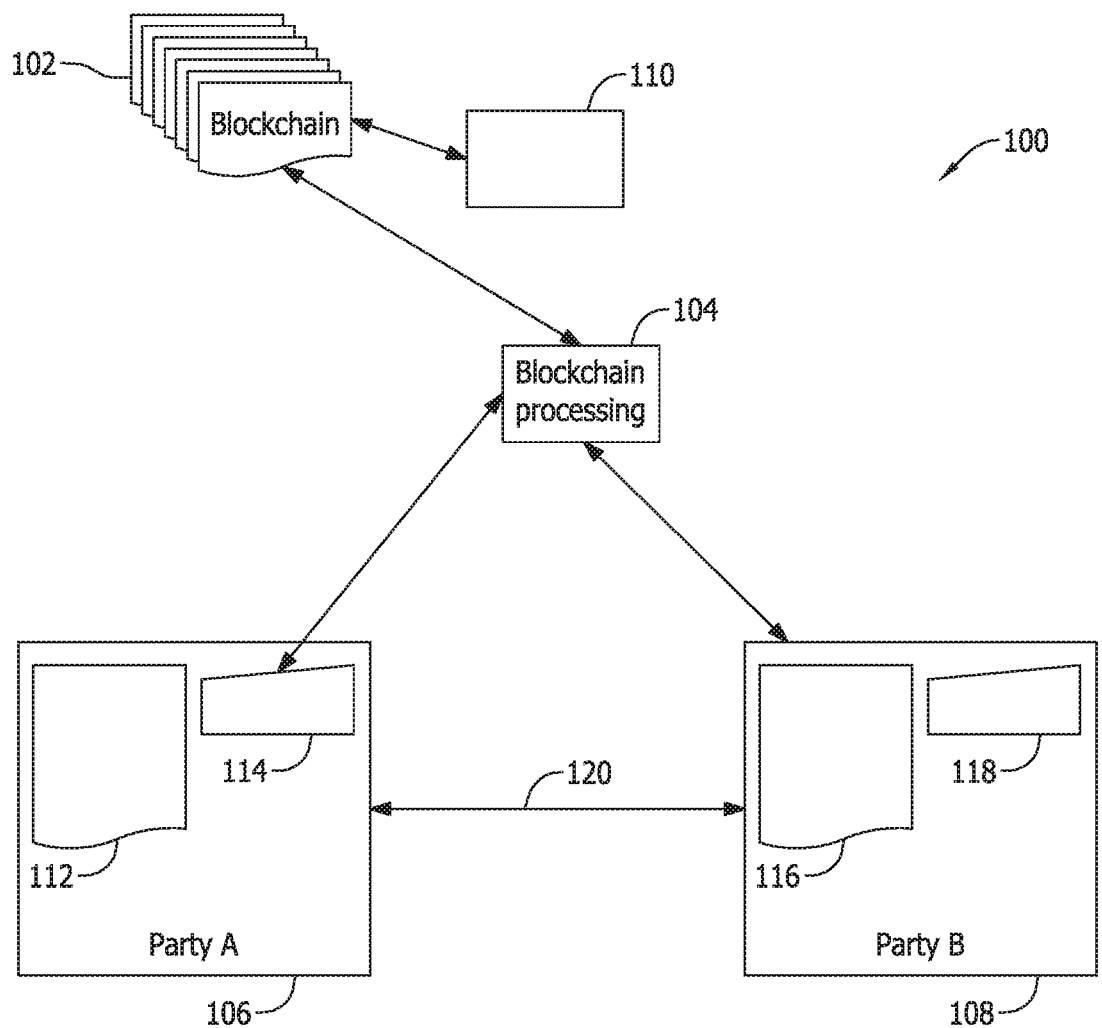
FIG. 1 is a schematic illustration of an exemplary blockchain implementation for a content transaction, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

The present inventors have discovered that blockchaining techniques can be utilized better secure content sharing and transactions between users and customers of a content provider. Although the principles described herein may be applicable to simple currency transactions or negotiations (e.g., bitcoin) between 2 parties, the embodiments described below are even more advantageously applied to transactions where the non-financial content itself is the "currency" of the exchange between customers/users. Such nonfinancial content, for purposes of this discussion, includes, but is not limited to, shared media, software, copyrighted works, licenses, security credentials and other forms of transferable content that are not strictly currency only. Such content is also referred to as "licensed-burdened content," and/or "valuable encumbered content." For simplification of discussion of the embodiments described herein, this concept will also be referred to as "Content as Currency," or CAC.

As described above, blockchaining utilizes cryptographic techniques to create digital ledgers of transactions. According to the systems and methods described herein, the application of blockchaining CAC transactions, and to increase transaction security over networks in general has wide applicability to the cable industry, as well as other networks over which transactions occur. These blockchaining techniques are further useful in measurement and isolation of content and bandwidth piracy. In addition to CAC transactions, the present embodiments also significantly increase transactional security in areas of, without limitation: enhanced content protection, by improving measurability and traceability of how media flows through networks; digital rights management (DRM); secure imaging; distributed denial of service (DDoS) mitigation and/or attacks; scalable Internet of Things (IoT) security solutions; supply chain integrity; device registration, and enhanced DRM and data over cable service interface specification (DOCSIS) security; enhanced content protection; connectivity negotiation; dynamic service creation or provisioning; service authentication; virtualization orchestration; and billing transformation.

With respect to CAC transactions in particular, the present embodiments allow the blockchain to be implemented to secure media sharing for customer driven applications. As explained further below, such implementations are applicable to both centralized and decentralized models, and can also be applied to secure hardware/software binding in virtualized environments and virtualization orchestration using secure hardware/software binding.

The present embodiments serve to both incentivize and monetize media sharing in significantly new ways that are not considered by conventional blockchain techniques. The present embodiments are further advantageous over conventional blockchain transactions in that the content itself can function as a currency transaction (CAC). Accordingly, the disclosed blockchain techniques are applied to enable, track, and report content transactions. Subscribers of media services, for example, can receive credits from a content provider for transactions. When such subscribers choose to view or buy content (in the case of media), the subscribers expend credits using a cipher transaction, which records on or more of the time, device ID, user ID, content ID, content license level, and other information related to the transaction and the respective electronic devices utilized to purchase or view the content. The transaction will then be reported by both the service provider and the user's device (hardware or software system) to a blockchain processing system (distributed, centralized, or other) that will add the cipher transaction to a blockchain ledger. Users can thus share content with other subscribers using a similar process. The rate of exchange of credits can vary when sharing according to the service providers marketing goals. Furthermore, the service provider may grant new credits to users who share content.

The value of the blockchain ledger in this CAC transaction environment is significant. The blockchain ledger can be used in reconciliation of content agreements between content providers and service providers. The embodiments herein are therefore further useful for data analytics on viewing practices, distribution patterns, media interest levels, communities of interest, and similar analytics that are applicable to CAC transactions. Under the embodiments herein, a particular subscriber's reputation and/or history can be a factor in granting media credits from a provider. Conversely, subscribers with a negative payment history can be restricted or prevented from receiving or sharing content, and users in communities of interest that have a lower payment probability can be similarly restricted, or alternatively receive fewer credits.

FIG. 1 is a schematic illustration of an exemplary blockchain system 100 implementing a content transaction between parties. System 100 includes a blockchain 102, a blockchain processor 104, a first party 106 (party A), and a second party 108 (party B). In an exemplary embodiment, system 100 further includes a data science subsystem 110. Data science subsystem 110 is, for example, an external memory device or a decentralized data storage center, as blockchains typically do not store large amounts of data. In the exemplary embodiment, first party 106 is an electronic device that further includes a first memory 112 and a first processor 114, and second party 108 is also an electronic device that includes a second memory 116 and a second processor 118.

In operation, system 100 utilizes blockchain 102 and blockchain processor 104 to secure a transaction 120 between first party 106 and second party 108. In an exemplary embodiment, transaction 120 is a CAC transaction, as described above, and transaction 120 represents a negotiation between first party 106 and a second party 108 which, for example, may involve an offer from one of the parties to the other to deliver content, an acceptance by the other party, and a transfer of consideration therebetween. In the exemplary embodiment, first memory 112 and second memory 116 each are configured to store certificates and other information, including, without limitation, at least one of an envelope ID or transaction ID, a certificate of the respective party A or B, a user ID, a device ID, a media ID or hash, a media uniform resource identifier (URI), timestamps, ratings of the particular party and/or the content to be transferred, terms of agreement between the parties, licenses that may encumber the transferred content, and exchange rate information related to a monetary exchange between parties for the transfer of content.

In further operation, blockchain processor 104 is configured to electronically communicate, for example, over a cable, wired, or wireless electronic network, with respective first and second processors 114, 118. In an exemplary embodiment, party A (i.e., first party 106) initiates transaction 120 as an offer or invitation to share, sell, or transfer (e.g., by gift, information, or other transfer means) encumbered financial or non-financial content with party B (i.e., second party 108). In an alternative embodiment, party B initiates transaction 120 as a request for party A to transfer the encumbered content. In an exemplary embodiment, party B is a subscriber to party A, or vice versa. Alternatively, neither party is a subscriber of the other, but may opt in to transaction 120 upon receiving the initial offer, invitation, or request.

Once transaction 120 is initiated, party A compiles a body of information contained within memory 112 into an envelope, and processor 114 encrypts the envelope, including a media key, with a private key of party A, and submits the encrypted envelope to blockchain processor 104. In an alternative embodiment, party B also compiles and encrypts a similar envelope from information contained within memory 116, and processor 118 submits this other encrypted envelope to blockchain processor 104 as well.

In the exemplary embodiment, blockchain 102 and blockchain processor 104 add unique value to the sharing of CAC content between parties A and B over transaction 120 by actively providing the parties a stake in the supply chain. In conventional blockchain transactions involving only currency (e.g., bitcoin), parties A and B would merely be individual endpoints of a financial transaction with blockchain processor 104. That is, parties A and B would only interact directly blockchain processor 104 in the conventional system, and would not interact with each other, nor would they share encumbered and non-financial CAC content.

According to the exemplary embodiment, in the negotiation of certificates and information, transaction 120 may further include, without limitation, one or more of the following: existing policy terms encumbering, or license rights burdening, the CAC content; active communication between the parties; a transaction scaler or discount (which may apply to special offers are repeated transactions between the parties); a reputation of the parties; and automated policy driven applications that establish boundaries through which the negotiation between the parties can occur.

In an exemplary embodiment, the CAC content may be media content such as a video recording, an audio recording, or other copyrighted or copyrightable work, and the transfer of the CAC content from party A would allow party B the rights to view or otherwise experience the CAC content under the negotiated terms. For transaction 120, blockchain processor 104 is configured to utilize blockchain 102 to allow party A (the assignor, seller, or transferor) to: (a) confirm the negotiated payment or payment terms from party B; (b) verify that any licenses burdening the transferred CAC content are honored; (c) apply a temporal window within which transaction 120 must be completed or which transferred content may be experienced by party B; and (d) render the transferred CAC content transferable a third party by party B. The immutability of blockchain 102 further renders both transaction 120 and the transferred CAC content resistant to piracy and/or other unauthorized uses.

Additionally, utilization of blockchain 102 for transaction 120 also renders it significantly easier for party B (the buyer or transferee) to: (a) legally receive licensed content; (b) confirm the negotiated payment or payment terms to party A; (c) easily determine how long or how many times the transferred CAC content may be viewed or experienced; and (D) further transfer, sell, or gift the received CAC content to third parties subject to the negotiated terms, licenses, and other nonfinancial content transferred over transaction 120. According to the advantageous systems and methods disclosed herein, blockchain technology may be implemented such that the transferred CAC content itself is the "currency" verified by the immutable ledger of the blockchain (e.g. blockchain 102). In one embodiment, the transaction ID associated with transaction 120 may itself be considered the "coin" of the blockchain.

Figure 2:
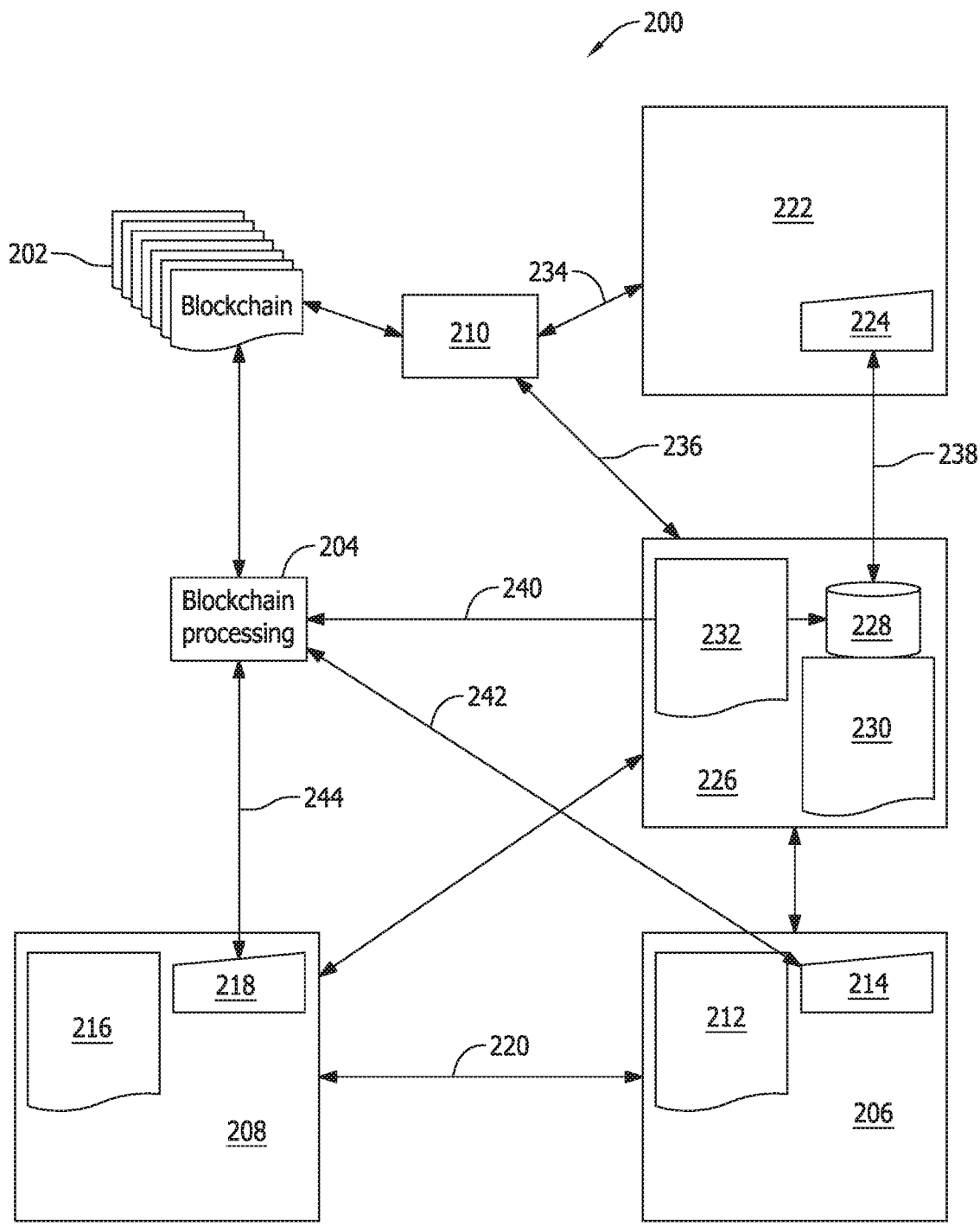
FIG. 2 is a schematic illustration of an alternative blockchain implementation for the content transaction depicted in FIG. 1.

FIG. 2 is a schematic illustration of an alternative blockchain system 200 to implement upon and verify a content transaction between parties. Similar to FIG. 1, system 200 includes a blockchain 202, a blockchain processor 204, a first party 206 (party A), and a second party 208 (party B). In an exemplary embodiment, system 200 further includes a data science subsystem 210, and first party 206 is an electronic device that further includes a first memory 212 and a first processor 214, and second party 208 is also an electronic device that includes a second memory 216 and a second processor 218.

In operation, system 200 utilizes blockchain 202 and blockchain processor 204 to secure a CAC transaction 220 between first party 206 and second party 208, similar to system 100 (FIG. 1). In the embodiment illustrated, CAC transaction 220 is similar to transaction 120, depicted in FIG. 1, and may include all of the parameters and considerations described above. System 200 expands upon system 100 in that it depicts a relationship of CAC transaction 220 between parties A and B, and further consideration of a content owner 222 of a master content 224 that is the subject of transaction 220, and also the presence of a service provider 226, which may be a portion of content owner 222, or a separate entity. In an exemplary embodiment, service provider 226 includes a media storage center 228, an account database 230, and a provider memory 232. Media storage center 228, account database 230, and provider memory 232 may all be integrated into the single media storage center 228, or be separate entities from one another within the control of service provider 228.

In the exemplary embodiment, provider memory 232 is similar to first memory 212 and second memory 216, in that provider memory 232 is configured to store certificates and other information, including, without limitation, at least one of an storage provider ID, a device ID, a media ID, a media uniform resource identifier (URI), timestamps, ratings of the parties (the parties are clients or subscribers of service provider 226) and/or master content 224, as well as licenses that may encumber the transferred content. Alternatively, ratings of the parties may be stored within account database 230, which may also store policy information that may be attached to master content 224 and thereby encumber CAC transaction 220. Optionally, account database 230 may include a processor (not shown) configured to create one or more accounts for individual clients (e.g., parties A, B) and populate the client credentials within account database 230.

In an exemplary embodiment, data science subsystem 210 is configured to be in electronic communication with one or more of content owner 222 and service provider 226. In operation, data science subsystem 210 is further configured to interactively communicate behaviors and/or statistics 234 with content owner 222. Optionally, data science subsystem 210 may also be configured to interactively communicate exchange rates, behaviors, and/or statistics 236 with service provider 226.

In further operation, system 200 may function much like system 100, in that the transaction ID (the "coin") and an envelope may be created by the initiation of transaction 220 between parties A and B. Alternatively, a media ID 238 (the "coin") and the envelope may be created by content owner 222 upon providing master content 224. According to this alternative embodiment, service provider 226 is further configured to provide a registration link 240 to register media ID 238 is a blockchain processor 204. In an exemplary embodiment, first party 206 further includes a first submission link 242 configured to allow first party 206 to submit transaction 220 to blockchain processor 204, and second party 208 further includes a second submission link 244 configured to allow second party 208 to also submit transaction 222 blockchain processor 204.

In the exemplary embodiment depicted in FIG. 2, for CAC transaction 220, implementation of blockchain 202 and blockchain processor 204 for system 200 confers upon parties A (assignor/seller) and B (buyer) all of the benefits and advantages realized by implementation of system 100, depicted in FIG. 1, above, except for the consideration of transaction 220 specifically including third parties, such as content owner 222 and service provider 226. System 200 further confers similar benefits specifically on these third parties. For example, utilization of blockchain 102 allows content owner 222 to: (a) confirm the payment or payment terms of its share of CAC transaction 220 that is transferred from party A to party B (or additional parties); (b) verify that any licenses burdening master content 224 are honored in CAC transaction 220; (c) apply a temporal window within which transaction 220 must be completed or which master content 224 may be experienced by parties A and/or B; and (d) set the transferability terms of the transferred CAC content. As with system 100, the immutability of blockchain 202 renders both transaction 220 and the transferred CAC content resistant to piracy and/or other unauthorized uses, which is of particular interest to content owner 222. Additionally, utilization of blockchain 202 significantly enhances the ability of content owner 222 2 audit the uses of master content 224 and track which parties may be experiencing such content.

Furthermore,, utilization of blockchain 202 for CAC transaction 220 also renders it significantly easier for service provider 226 to: (a) legally receive licensed content from content owner 222; (b) confirm the payment or payment terms of its share of CAC transaction 220 that is transferred from party A to party B (or additional parties); (c) easily determine how long or how many times the transferred CAC content has been viewed or experienced; and (D) more easily allow for the transfer, sale, or gifting of the licensed CAC content to additional users, devices, and/or peers, and all subject to the negotiated terms, licenses, and other nonfinancial content transferred over transaction 220.

Through implementation of blockchain 202, service provider 226 further gains the benefit of additional control of the distribution of master content 224, as such content is encumbered and transferred among clients and subscribers of service provider 226. Service provider 226 can rely on the immutability of blockchain 202 to provide content owner 222 verifiable information regarding the use of master content 224, but without necessarily having to share statistics regarding individual viewers or users which may be subscribers to service provider 226. In an exemplary embodiment, service provider 226 may further offer its subscribers, according to the terms of a subscription or purchase (which may also encumber the CAC content of CAC transaction 220), a media budget against which individual subscribers (e.g. parties A, B) may exchange media in further consideration of such parameters as a variable exchange rate, an exchange rate that is negotiated or based on demand, or an exchange rate based on the particular licensing and/or burden restrictions on the CAC content.

Figure 3:
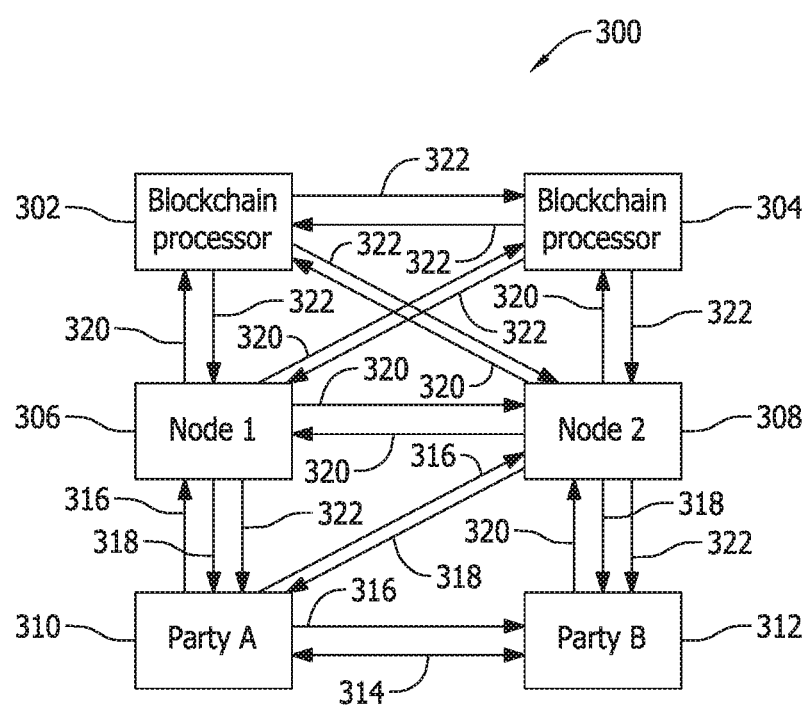
FIG. 3 is a schematic illustration of an exemplary blockchain implementation for the content transaction depicted in FIGS. 1 and 2 according to a distributed model.

FIG. 3 is a schematic illustration of an exemplary blockchain system 300 that may be implemented for the CAC transactions depicted in FIGS. 1 and 2, according to a distributed model. For ease of explanation, some of the elements from FIGS. 1 and 2 are not shown in FIG. 3 (or FIGS. 4 and 5, below), but a person of ordinary skill in the art, after reading and comprehending the present disclosure, will understand how and where such additional elements to be implemented within system 300, and the system is further described below.

In an exemplary embodiment, system 300 includes a first blockchain processor 302, a second blockchain processor 304, a first node 306, a second node 308, a first party 310 (party A), and a second party 312 (party B). System 300 utilizes a distributed model to verify a negotiated CAC transaction 314 between parties A and B. System 300 further includes broadcasts 316 of CAC transaction 314 containing an envelope, acknowledgments 318 of the transaction validity, transaction propagations 320 between the several entities, and iteration propagations 322 of each processing iteration of the blockchain.

In the distributed model illustrated in FIG. 3, blockchaining technology is thus applied to enable, track, and report CAC content transactions between parties (i.e., parties A and B). The advantageous model of system 300 thereby allows for the enabling, providing, exchanging, and/or transferring of the rights to view/experience content subject to CAC transaction 314. For example, in operation, when a party chooses to view or buy content, a negotiation occurs between party A and party B that may result in one or more of a cipher transaction, the recordation of the time, and/or communication of a device ID, user ID, content ID, content license level, and/or other information that enables the providing, exchanging, or transferring the right to view CAC content. In an exemplary embodiment, details of CAC transaction 314 will be compiled into an envelope by Party A, and then submitted to distributed blockchain processing system 300 according to the illustrated model, and then add relevant details of transaction 314 to a distributed blockchain ledger (not shown).

In an exemplary operation of system 300, party A chooses to share, sell, or transfer CAC content to party B. A negotiation (i.e., CAC transaction 314) occurs, which can be based upon policies and/or rules, and parties A and B agree to terms. Party A then compiles a body of information into an envelope, which may include a media key, and may encrypt the envelope, body of information, and media key using a private key of party A. In this example, the envelope may thus form the basis for establishing CAC transaction 314, and the envelope is broadcast (i.e., broadcast 316) to blockchain nodes and parties to which party A is connected. The parties may then further relay details of CAC transaction 314 to other connected nodes and parties (i.e., transaction propagations 320).

Upon receipt of details of CAC transaction 314, first node 306 and second node 308 are configured to validate the transaction using the public key of party A. Once the transaction is validated, first node 306 and second node 308 are configured to transmit an acknowledgment (i.e., acknowledgment 318) to submitting parties A and B. Also upon receipt of details of CAC transaction 314, first blockchain processor 302 and second blockchain processor 304 are further configured to add the details of the transaction to a pending block of the associated blockchain. At an appropriate time interval, processors 302, 304 are also configured to determine the appropriate blockchain among those which may be stored and propagated, which may be, for example, the longest or highest chain. Processors 302, 304 may then append new transactions to the determined blockchain and estimate the next hash. If solved within the appropriate time interval, the solution is propagated (i.e., iteration propagation 322) to connected processors, nodes, and parties, where appropriate. In some instances, parties may not be directly connected to blockchain processors, and thus may not receive iteration propagations.

Figure 4:
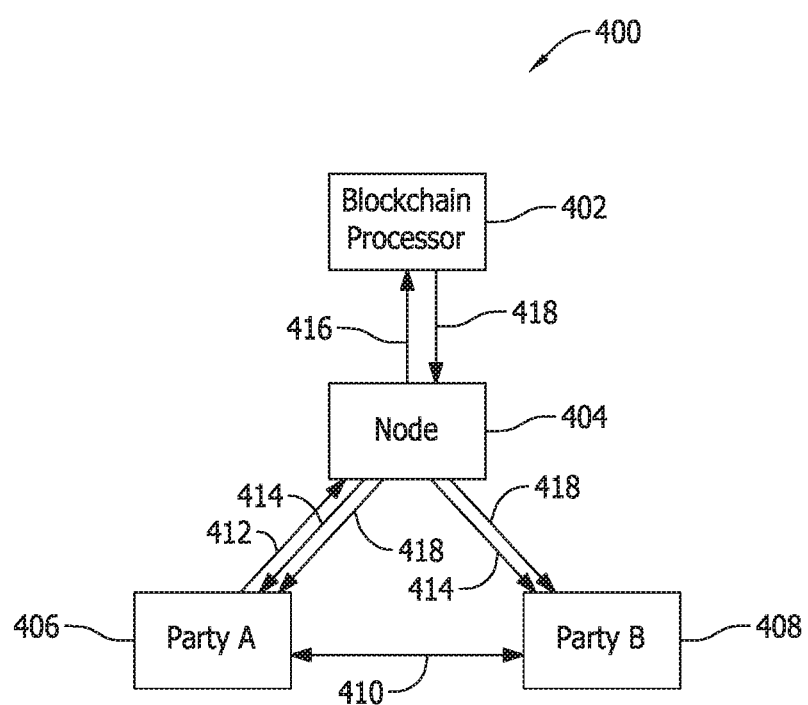
FIG. 4 is a schematic illustration of an exemplary blockchain implementation for the content transaction depicted in FIGS. 1 and 2 according to a centralized model.

FIG. 4 is a schematic illustration of an exemplary blockchain system 400 that may be implemented for the CAC transactions depicted in FIGS. 1 and 2, according to a centralized model. In an exemplary embodiment, system 400 includes a blockchain processor 402, a node 404, a first party 406 (party A), and a second party 408 (party B). System 400 utilizes a centralized model to verify a negotiated CAC transaction 410 between parties A and B. For ease of explanation, system 400 is illustrated as a simplified architecture featuring a single node and a single blockchain processor. In practice, system 400 may include a plurality of redundant nodes and blockchain processors to enhance reliability of the system. In such expanded embodiments, each transaction may be propagated to at least two nodes and at least two blockchain processors, and utilizing reliable transmission protocols.

According to the exemplary centralized model, system 400 further includes a broadcast 412 of CAC transaction 410, containing an envelope, from party A to node 404, acknowledgments 414 of the transaction validity from node 404 to parties A and B, a transaction propagation 416 from node 404 to blockchain processor 402, and transaction acceptances 418 from blockchain processor 402, to node 404, and to parties A and B. This centralized model of system 400 differs from the distributed model of system 300 in that the centralized model allows all information from the parties (e.g., first party 406 and second party 408) to first pass through the node (e.g., node 404) before reaching the blockchain processor (e.g., blockchain processor 402). The centralized model can provide significantly more consistency, and also more control by a content owner and/or service provider over CAC transactions between their subscribers.

In the exemplary centralized model illustrated in FIG. 4, blockchaining is implemented to advantageously enable, track, and report CAC content transactions between parties (i.e., parties A and B). This implementation thus allows for the enabling providing, exchanging, and/or transferring the right to view content. For example, in operation, when a party chooses to view or buy content, a negotiation occurs between Party A and Party B which may result in one or more of a cipher transaction, the recordation of the time, and/or communication of a device ID, user ID, content ID, content license level, and/or other information that enables the providing, exchanging, or transferring the right to view CAC content. In an exemplary embodiment, details of CAC transaction 410 may be reported by both parties A and B, or alternatively only by party A, to centralized blockchain processing system 400 according to the illustrated model, and then add relevant details of transaction 410 to a distributed blockchain ledger (not shown).

In an exemplary operation of system 400, party A chooses to share, sell, or transfer CAC content to party B. A negotiation (i.e., CAC transaction 410) occurs, which can be based upon policies and/or rules, and parties A and B agree to terms. Party A then compiles a body of information into an envelope, which may include a media key, and may encrypt the envelope, body of information, and media key using a private key of party A, similar to the distributed model of system 300. In this example, the envelope may similarly form the basis for establishing CAC transaction 410, and the envelope is submitted (i.e., broadcast 412) to blockchain node 404. Alternatively, both parties A and B may submit envelopes to blockchain node 404.

Upon receipt of details of CAC transaction 410, node 404 is configured to validate the transaction using the public key of party A. Once the transaction is validated, node 404 is configured to transmit an acknowledgment (i.e., acknowledgments 414) to submitting parties A and B, and then relay (i.e., transaction propagation 416) the details of validated transaction 410 to blockchain processor 402. In the alternative embodiment, where both parties A and B submit envelopes to node 404, each such envelope must be separately validated and compared to determine its validity.

Also upon receipt of details of CAC transaction 410, blockchain processor 402 is further configured to add the details of the transaction to a pending block of the associated blockchain. At an appropriate time interval, blockchain processor 402 is also configured to process the pending block and append the relevant transaction information to the prior blockchain while computing and/or estimating the appropriate hash. Similar to system 300, the solution may then be propagated. In an alternative embodiment, the use of time intervals and hash estimations may be further implemented to increase the security of the blockchain. The time of the transaction and its processing thus become significant advantageous security features of the blockchain using the centralized model of FIG. 4.

In an alternative embodiment, for security purposes, blockchain processor 402 is configured to share and elect additional blockchains similar to the distributed architecture of FIG. 3, but still subject to the centralized model as illustrated. In a further alternative, system 400 may be implemented with cryptographic acceptance by party B, and may also be implemented in both symmetric and asymmetric blockchain processing systems and methods.

Figure 5:
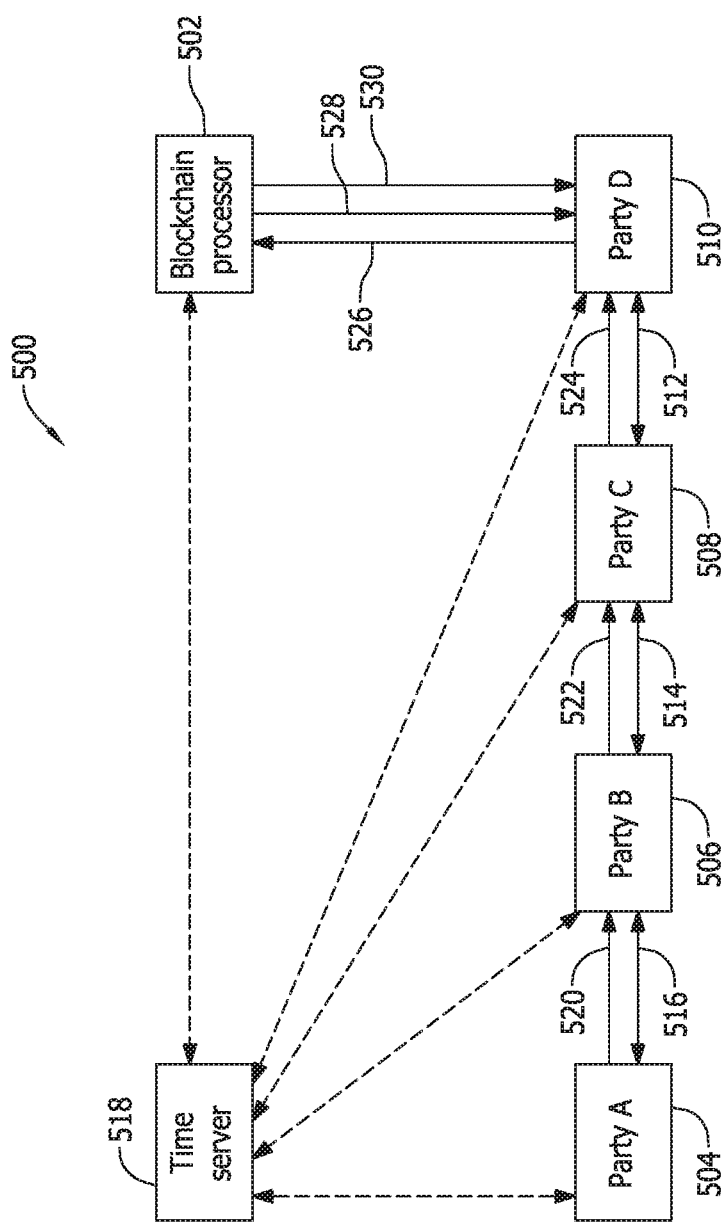
FIG. 5 is a schematic illustration of an exemplary blockchain implementation for the content transaction depicted in FIGS. 1 and 2 according to a linear model.

FIG. 5 is a schematic illustration of an exemplary blockchain system 500 that may be implemented for the CAC transactions depicted in FIGS. 1 and 2, according to a linear model. In an exemplary embodiment, system 500 includes a blockchain processor 402, a first party 504 (party A), a second party 506 (party B), a third party 508 (party C), and a fourth party 510 (party D). System 500 utilizes a linearized model to verify a series of negotiated CAC transactions 512, 514, 516 among the several parties.

For ease of explanation, system 500 is illustrated as a simplified architecture featuring no nodes and a single blockchain processor. In practice, system 500 may include a plurality of redundant nodes and blockchain processors to enhance reliability of the system. Additionally, system 500 is illustrated with 4 parties, however, the series of linear CAC transactions 512, 514, 516 will be understood by a person of ordinary skill in the art to apply to more or fewer parties to implement the linear model structure.

In an exemplary embodiment, system 500 further includes a time server 518, which represents a secure time distribution (dashed lines) over an operable electronic communication network with each of blockchain processor 502, and parties 504, 506, 508, 510. In an exemplary embodiment, the linear model represented by system 500 may consider the time of the respective transactions and their processing as important security features, similar to the centralized model represented by system 400. In an alternative embodiment, time may be relayed in the linear model rather than sent directly to each node (not shown) may be included with system 500. In a further alternative embodiment, where a high degree of trust may exist among the parties and processors in the environment of system 500, time server 518 may be omitted, and each node within system 500 may use its own local time. Where a lower degree of trust exists in the environment of system 500 between the parties, the system architecture, or the cryptography, each respective party can iteratively send details of the relevant one of CAC transactions 512, 514, 516 to one or more nodes, and only the last party involved in the particular transaction need report the transaction to the node (or to blockchain processor 502).

According to the exemplary linear model depicted in FIG. 5, system 500 further includes a plurality of submissions 520, 522, 524, 526 of the respective CAC transactions, containing an envelope, from party A, up the linear chain to party D, and then on to blockchain processor 502 (which may include an intervening node, not shown). System 500 further includes an acknowledgment 528 of the transaction validity from blockchain processor 502 to the last party in the linear chain of transactions (party D in this example) and a transaction acceptance 530 from blockchain processor 502 to party D (the final party in the transaction).

This linear model of system 500 differs from the distributed and centralized models (FIGS. 3 and 4, respectively) in that a single party (i.e., party D) serves as the "final node" in the series of transactions, or alternatively, is the sole party this series of transactions to broadcast a node. The particular party that is selected to be the final node can be predetermined, for example, by being the first licensee of a particular master content from a content owner or service provider, or alternatively, the party can be determined in real time according to time limitations encumbering rights of content transfer, or by a limit on the number of transfers allowed, of which may be transmitted to system 500 by a content owner or service provider as part of the CAC content. This linear model is particularly advantageous in implementations where a single master content be shared, gifted, sold, or otherwise transferred to multiple parties without requiring a separate negotiation between all the parties of the chain and/or the service provider.

In the exemplary linear model illustrated in FIG. 5, blockchaining is implemented to advantageously enable, track, and report CAC transactions between multiple parties (i.e., parties A, B, C, D). This implementation thus further allows for the enabling, providing, exchanging, and/or transferring of the right to view or otherwise experience licensed content. For example, in operation, when a party chooses to view or buy content, a negotiated CAC transaction 512 occurs between party D and party C, which may result in one or more of a cipher transaction, the recordation of the time, and/or communication of a device ID, user ID, content ID, content license level, and/or other information that enables the providing, exchanging, or transferring the right to view CAC content. In the example shown, party C then initiates with, or responds to a request from, party B for negotiated CAC transaction 514 regarding the same CAC content, which may be further encumbered after being received by party C. A similar negotiated CAC transaction 516 may occur between party B and party A over the same CAC content, in the event where the linear transfer continues beyond party B. In each respective CAC transaction, the respective parties agree to terms, and the transactions may be based upon policies and/or rules.

In this example, party A will first compile the body of information into an envelope, which may include a media key, and may encrypt the envelope, body of information, and media key using a private key of party A. Similar to the examples discussed above, the envelope may form the transaction basis, and the envelope is then submitted (i.e., submission 520) next party in line, which is party B in this example. This process will then be iterated until the CAC transaction arrives at the final node, which is party D in this example.

Upon receipt of the respective CAC transaction, the respective receiving party is configured to validate the transaction using the public key of party A. Once the transaction is validated, the receiving party may acknowledge the transaction to the submitting party or parties. When reaching the final transaction (i.e., CAC transaction 512) in the linear architecture, the final node party (i.e., party D) is configured to relay (i.e., submission 526) the transaction to blockchain processor 502. If the transaction is not the final transaction linear chain (e.g., CAC transaction 514), the receiving party is configured to append the prior transaction to a new transaction, which may then be submitted to the next party in the linear chain.

In an exemplary embodiment, upon receipt the transaction by blockchain processor 502 (i.e., from submission 526), blockchain processor 502 is configured to verify the validity of the transaction. Once a validated, blockchain processor is configured to acknowledge (i.e., by acknowledgment 528) the validity to the providing party (party D in this example) and add the details of the transaction to a pending block of the associated blockchain. At an appropriate time interval, blockchain processor 502 is further configured to process the pending block and append the relevant transaction information to the prior blockchain while computing and/or estimating the appropriate hash. The solution may then be propagated. In an alternative embodiment, the final party may relay the transaction acknowledgment and acceptance through the linear architecture.

In an alternative embodiment, each party in the linear chain of system 500 may function as a blockchain processor, thereby itself creating a blockchain and propagating the created blockchain according to any of the embodiments described above, in cooperation with this linear model.

Figure 6:
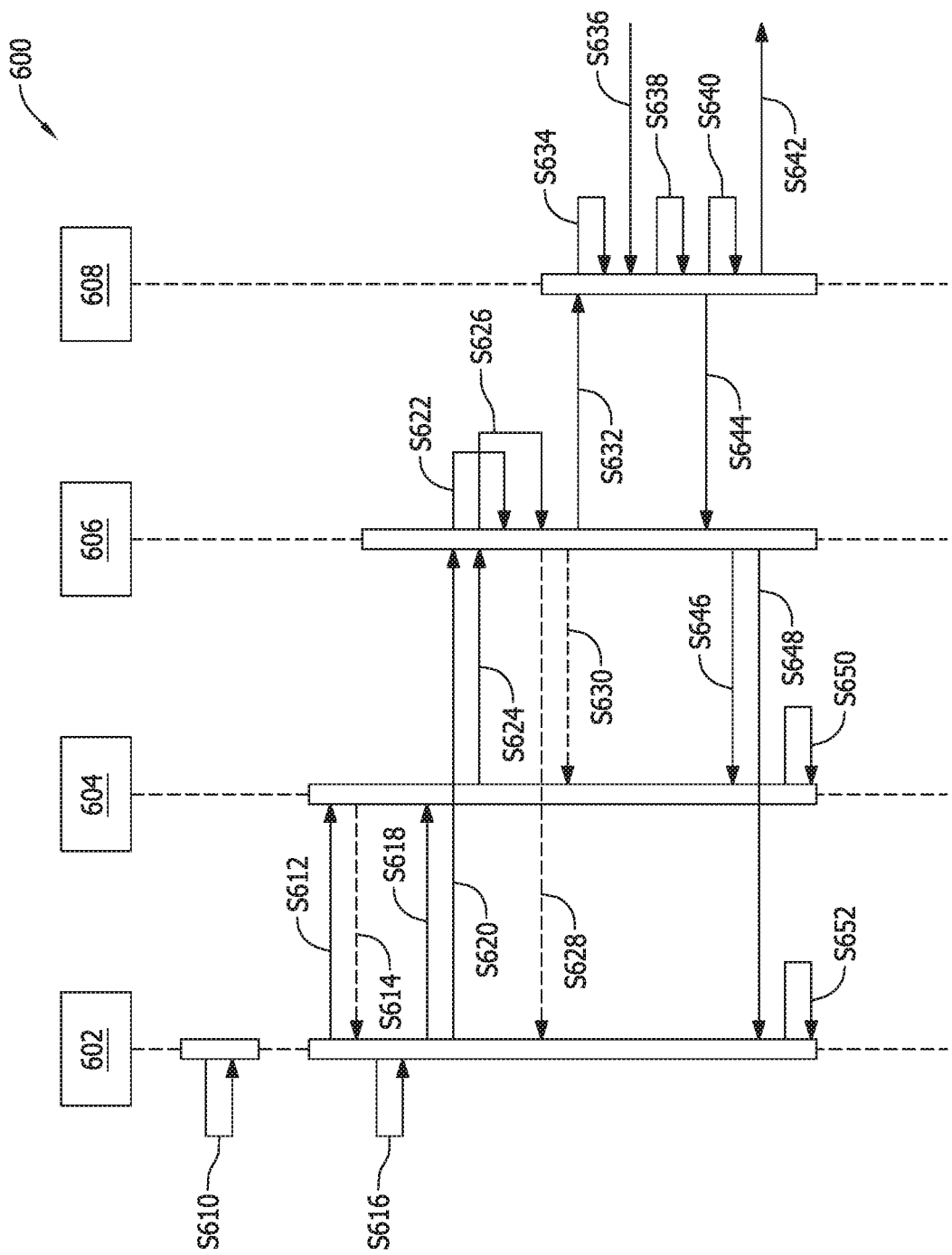
FIG. 6 is a sequence diagram for an exemplary blockchain implementation for a content transaction, according to an embodiment.

FIG. 6 is a sequence diagram for an exemplary blockchain process 600 which may be implemented for a CAC transaction according to the embodiments described herein. In an exemplary embodiment, process 600 includes a content owner 602, a content distributor 604, a blockchain node 606, and a blockchain processor 608. Similar to the embodiments described above, the CAC transaction may include, without limitation, one or more of an envelope ID, content owner data, content owner device data, content distributor data, content distributor device data, time and timestamps, media ID, media URI, license and policy information, and exchange rate information.

When implemented, process 600 may execute the following steps, which are not necessarily required to be in the order listed, except where so clearly designated as being dependent on a prior step. In step S610, content owner will create media metadata to append to a master content (not shown). In step S612, content owner 602 will negotiate terms with content distributor 604. In step S614, content distributor 604 agrees to terms with content owner 602. In step S616, content owner compiles an envelope containing encrypted data and a private key. In step S618, content owner 602 transmits a transaction message to content distributor 604 and also, in step S620, a transaction message blockchain node 606. In step S622, blockchain node 606 validates the transaction with a public key of content owner 602. In step S624, content distributor 604 relays the transaction message to blockchain node 606, and blockchain node 606 validates this transaction as well in step S626. Blockchain node 606 transmits the validation to content owner 602 in step S628, and to content distributor 604 in step S630.

In step S632, blockchain node 606 transmits a message regarding the validated transaction to blockchain processor 608. Blockchain processor 608 then adds the transaction to a pending block in the blockchain in step S634. In step S636, blockchain processor 608 may optionally include blockchain information from other processors. In step S638, blockchain processor 608, at the appropriate time, may determine the appropriate blockchain from among those stored and/or propagated, such as the longest or highest chain, for example. Blockchain processor 608 will append the pending block to the blockchain and compute the next blockchain iteration in step S640. Blockchain 608 may then transmit the block changes to other processors in step S642, and to the blockchain node 606 in step S644. Blockchain node 606 may then relay the blockchain to content distributor 604 in step S646, and to content owner 602 in step S648. Content distributor may verify the blockchain transaction in step S650, and content owner 602 may verify the blockchain transaction in step S652.

Figure 7:
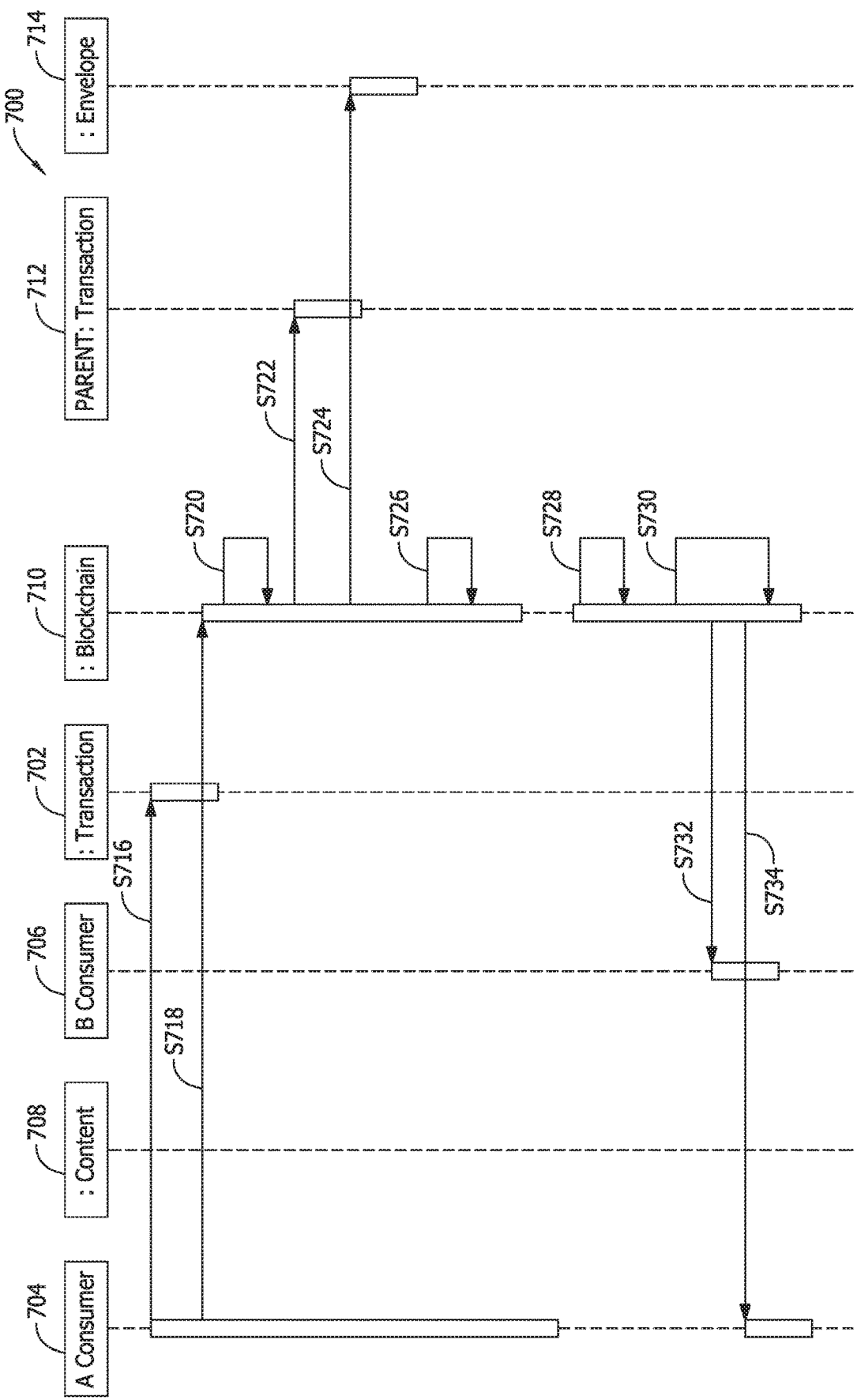
FIG. 7 is a sequence diagram illustrating a consumer sharing content utilizing an exemplary blockchain process, according to an embodiment.

FIG. 7 is a sequence diagram for an exemplary blockchain subprocess 700 which may be implemented for a CAC transaction between two parties/consumers according to the embodiments described herein. In an exemplary embodiment, subprocess 700 illustrates steps relating to a CAC transaction 702, between a first party 704 (party A) and a second party 706 (party B), to share content 708, utilizing a blockchain 710, and with respect to a parent transaction 712 and an envelope 714. In the example illustrated, subprocess 700 assumes that party A has already purchased, rented, or otherwise has rights to content 708 and is entitled to share content 708 with party B.

When implemented, subprocess 700 may execute the following steps, which are not necessarily required to be in the order listed, except where so clearly designated as being dependent on a prior step. In step S716, party A initiates CAC transaction 702, which includes information such as the basis for sharing, the shared content 708, and destinations to which content 708 may be transmitted, downloaded, viewed, or otherwise experienced. In step S718, party A submits information regarding CAC transaction 702 to blockchain 710. Step S720, blockchain 710 searches for the transaction and all prior blocks, and returns once locating parent transaction 712, starting from the most recent block in blockchain 710.

In step S722, blockchain 710 communicates with parent transaction 712 to get envelope 714, and in step S724, blockchain 710 indicates with envelope 714 to get further details regarding the transaction. In step S726, blockchain 710 evaluates a script of envelope 714. In some instances, the evaluated script may warrant collection and evaluation of other parent transactions. A single parent transaction (i.e., parent transaction 712) is illustrated in this example for ease of explanation. In an exemplary embodiment, the evaluation performed in step S726 may further include breadth and depth limits established for sharing content 708 that may be established by one or more of the content creator, owner, and distributor (not shown). Other criteria which may be considered in evaluation step S726 include, without limitation permissions for the particular consumer being allowed to share (party A in this example), among other restrictions. For further ease of explanation, subprocess 700 presumes that party A is successfully allowed to share content 708.

In step S728, blockchain 710 creates a block, which is explained further below with respect to FIG. 10. In step S730, blockchain 710 is configured to generate notifications for observers of subprocess 700, including parties A and B. In an exemplary embodiment, blockchain 710 will also generate notifications for a distributor and/or a content creator or owner in step S730. Blockchain 710 transmits a notification party B in step S732, and to party A in step S734.

Figure 8:
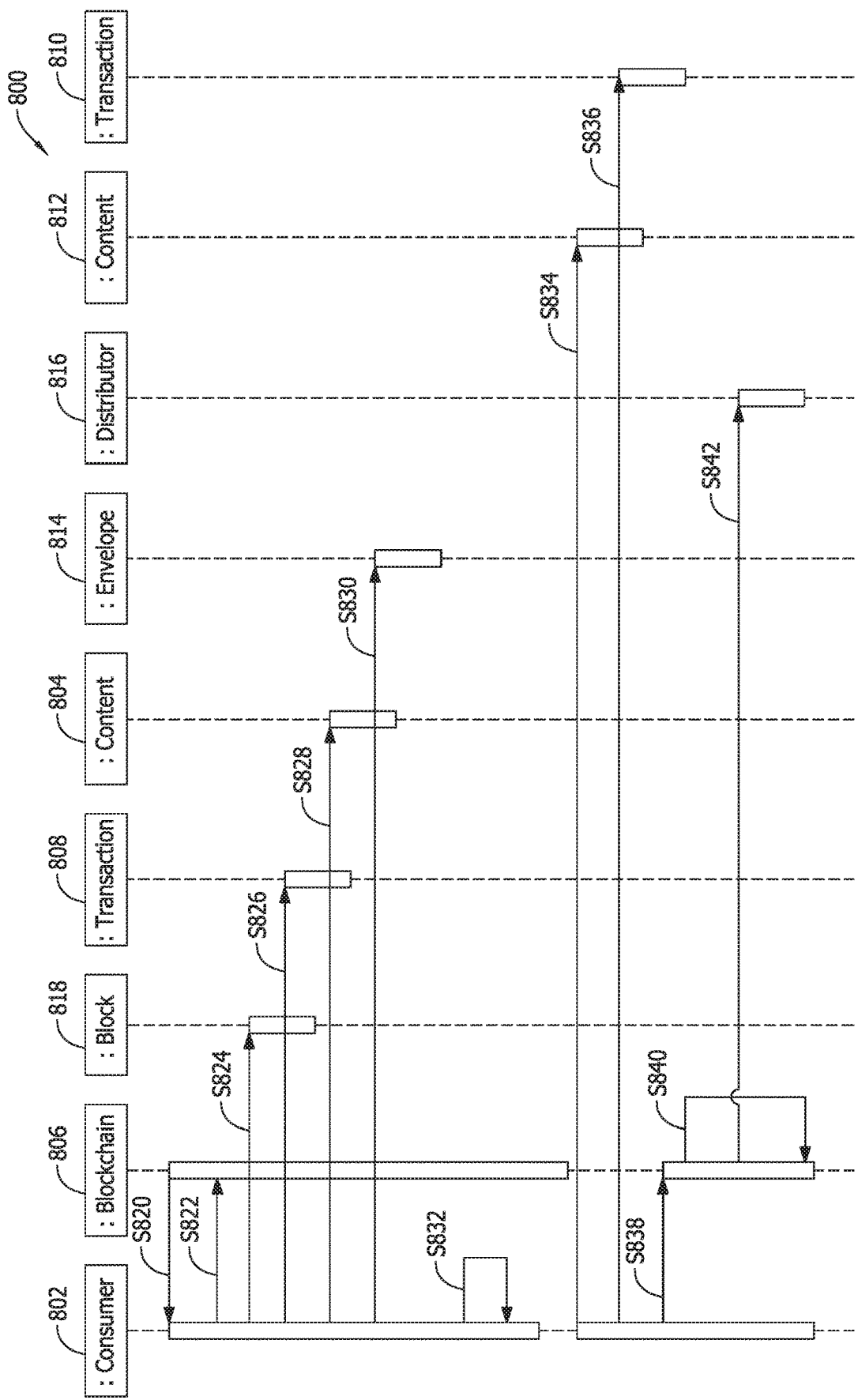
FIG. 8 is a sequence diagram illustrating a consumer purchasing content utilizing an exemplary blockchain process, according to an embodiment.

FIG. 8 is a sequence diagram for an exemplary blockchain subprocess 800 which may be implemented for a CAC transaction involving a consumer purchasing content according to the embodiments described herein. In an exemplary embodiment, subprocess 800 illustrates steps regarding how a consumer 802 may evaluate offered content 804, utilizing a blockchain 806, through a negotiated CAC transaction 808, which progresses into a final transaction 810, for purchased content 812, which may further include an envelope 814, a distributor 816, and at least one block 818 of blockchain 806.

When implemented, subprocess 800 may execute the following steps, which are not necessarily required to be in the order listed, except where so clearly designated as being dependent on a prior step. In step S820, blockchain 806 notifies consumer 802 of an offer for purchase. In this example, subprocess 800 presumes that consumer 802 is already registered to receive notifications from blockchain 806 (or distributor 816). In step S822, consumer 802 communicates with blockchain 806 to get block 818. In step S824, consumer 802 communicates with block 818 to get negotiated CAC transaction 808. In step S826, consumer 802 communicates with negotiated CAC transaction 808 to get offered content 804. In step S828, consumer 802 gets envelope 814 from offered content 804. In step S830, consumer 802 communicates with envelope 814 to get details regarding envelope 814 and the information compiled therein.

In step S832, consumer 802 evaluates envelope 814 to determine if a contract (established, for example, by the content creator) is desirable to purchase rights to view or experience the content. In an exemplary embodiment, the contract by the content creator may be further refined by distributor 816, through allowable changes, which will be reflected in envelope 814, which will include a digital contract. Step S834 presumes consumer 802 has determined contract terms evaluated in step S832 acceptable, and agrees to purchase offered content 804. Accordingly, in step S834, consumer 802 accepts the terms to create purchased content 812. In step S836, consumer 802 initiates final transaction 810 to obtain rights to purchased content 812.

In step S838, consumer 802 submits final transaction 810 to blockchain 806. In step S840, blockchain 806 generates a notification to observers of final transaction 810. In an exemplary embodiment, the generated notification from step S840 is transmitted distributor 816 in step S842 in the case where consumer 802 is agreeing to receive purchased content 812 from distributor 816. Additionally, the generated notification from step S840 may be further sent as an alert to the content creator (not shown), who may have subscribed to events indicating purchase of content from the content creator.

Figure 9:
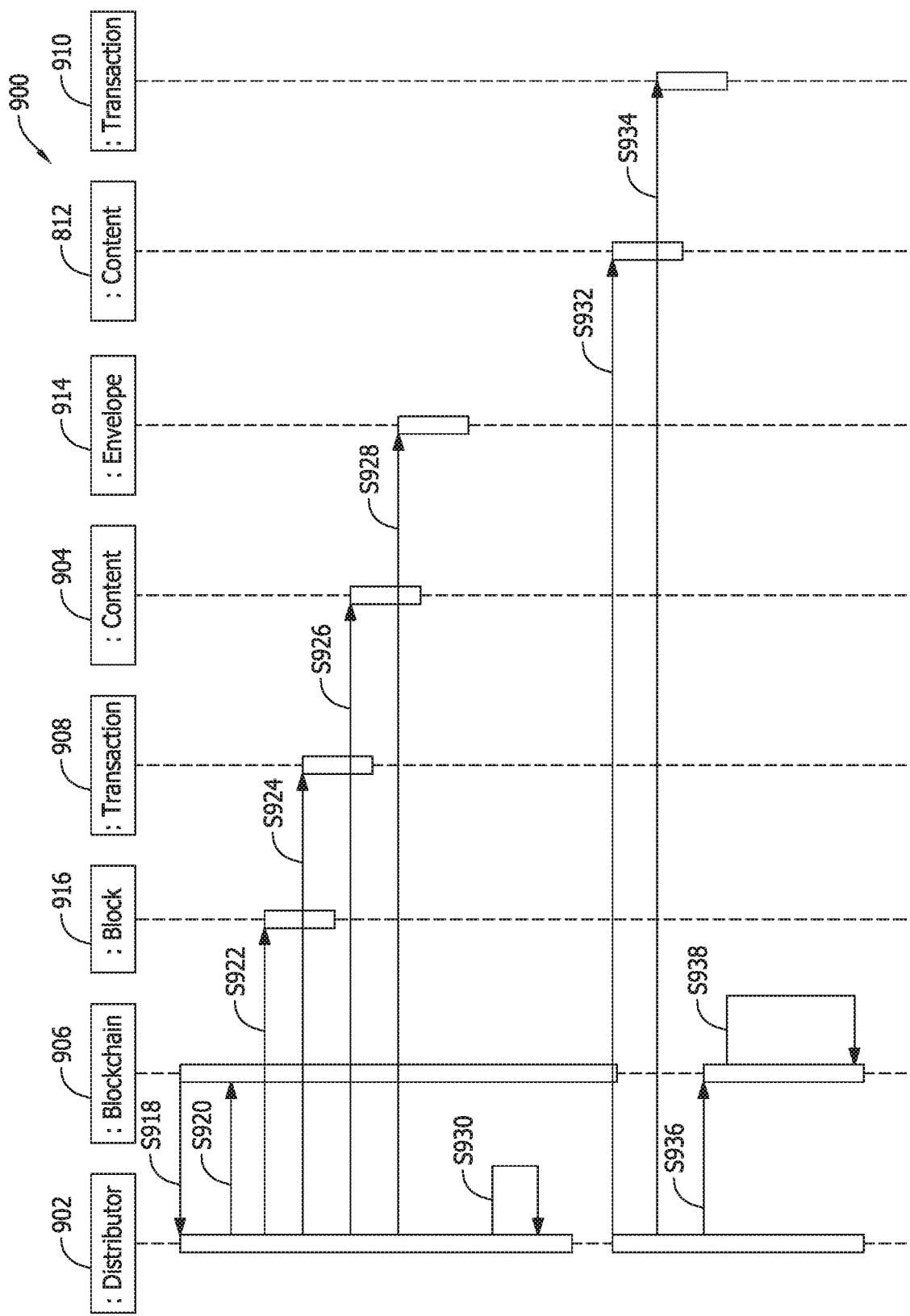
FIG. 9 is a sequence diagram illustrating an interaction with an exemplary blockchain process by a content distributor, according to an embodiment.

FIG. 9 is a sequence diagram illustrating an exemplary subprocess 900 of an interaction by a content distributor with a content creator or owner, utilizing a blockchain according to the embodiments described herein. In an exemplary embodiment, subprocess 900 illustrates steps regarding how a content distributor 902 may evaluate offered content 904 from a content creator/owner (not shown), utilizing a blockchain 906, through a negotiated CAC transaction 908, which progresses into a final transaction 910, for distributed content 912, which may further include an envelope 914, and at least one block 916 of blockchain 906.

When implemented, subprocess 900 may execute the following steps, which are not necessarily required to be in the order listed, except where so clearly designated as being dependent on a prior step. In step S918, blockchain 906 notifies content distributor 902 of an offer from a content creator to distribute content. In this example, subprocess 900 presumes that content distributor 902 is already registered to receive notifications from blockchain 906 (or for the content creator) about blocks posting new content for distribution.

In step S920, content distributor 902 communicates with blockchain 906 to get block 916. In step S922, content distributor 902 communicates with block 916 to get negotiated CAC transaction 908. In step S924, content distributor 902 communicates with negotiated CAC transaction 908 to get offered content 904. In step S926, content distributor 902 gets envelope 914 from offered content 904. In step S928, content distributor 902 communicates with envelope 914 to get contract information from the content creator/owner.

In step S930, content distributor 902 evaluates envelope 914 to determine if a contract (established, for example, by the content creator) is desirable to purchase distribution rights to offered content 904. In an exemplary embodiment, the envelope 914 may include a digital contract. Step S932 presumes content distributor 902 has determined contract terms evaluated in step S930 acceptable, and agrees to distribute offered content 904. Accordingly, in step S932, content distributor 902 accepts the terms to create distributed content 912. In step S934, content distributor 902 initiates final transaction 910 to obtain rights to distributed content 912.

In step S936, content distributor 902 submits final transaction 910 to blockchain 906. In step S938, blockchain 906 generates a notification to observers of final transaction 910, to be sent as an alert to the content creator/owner. In an alternative embodiment, the notification from step S938 may also generate an alert for relevant consumers, which may occur at substantially the same time, or at a later time. In a further alternative embodiment, the creation of block 916 (discussed below with respect to FIG. 10) may occur with the transaction generation in subprocess 900, or at the time envelope 914, which includes the contract, is generated to wrap the transaction.

Figure 10:
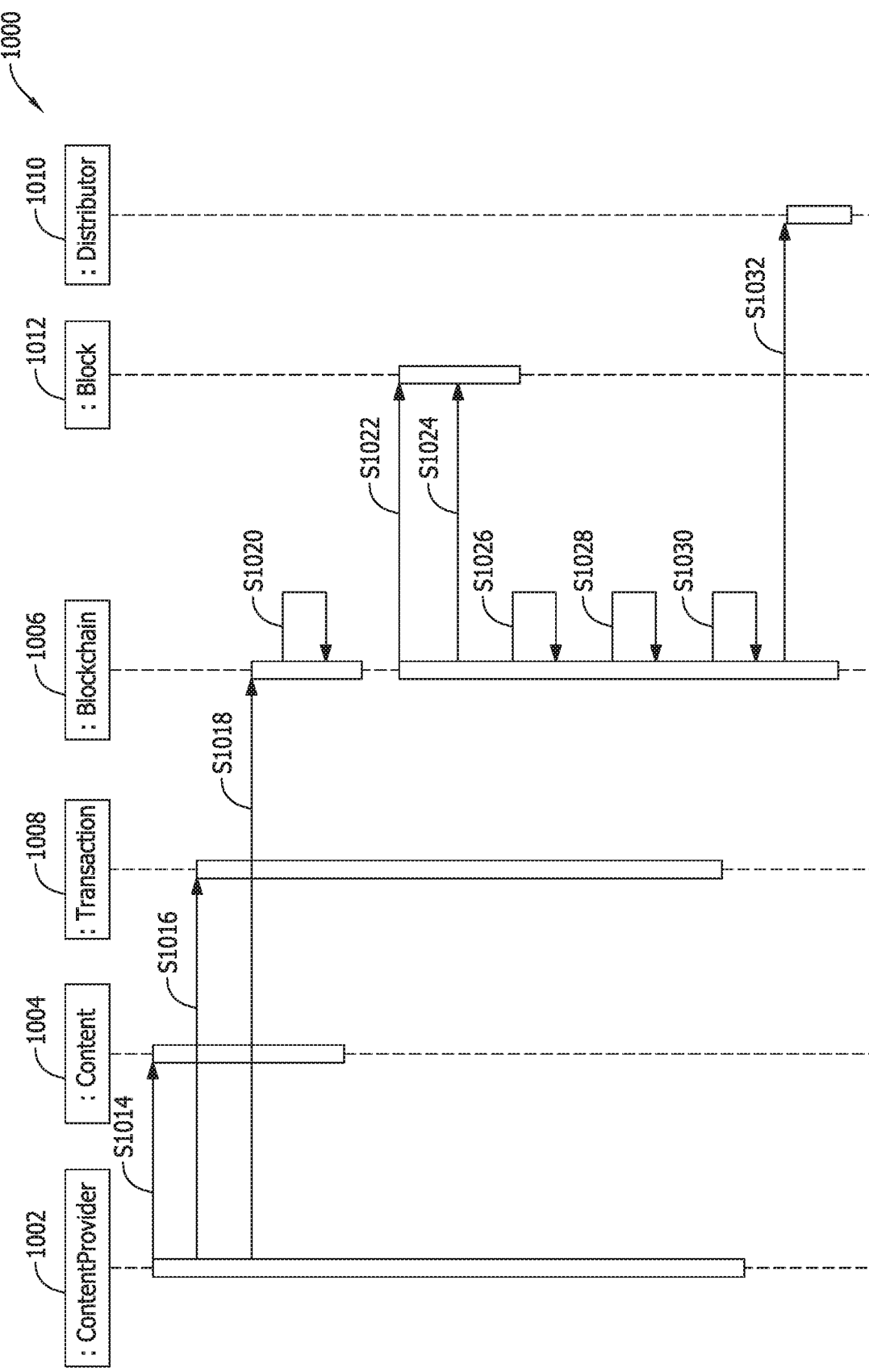
FIG. 10 is a sequence diagram illustrating an interaction with an exemplary blockchain process by a content provider, according to an embodiment.

FIG. 10 is a sequence diagram illustrating an exemplary subprocess 1000 of an interaction by a content provider with a distributor, utilizing a blockchain according to the embodiments described herein. In an exemplary embodiment, subprocess 1000 illustrates steps regarding how a content provider 1002 may implement configurable consensus to provide content 1004, utilizing a blockchain 1006, through a CAC transaction 1008, to a distributor 1010, and generating at least one block 1012 of blockchain 1006.

When implemented, subprocess 1000 may execute the following steps, which are not necessarily required to be in the order listed, except where so clearly designated as being dependent on a prior step. In step S1014, content provider 1002 creates content 1004 to submit for transaction 1008. In step S1016, content provider 1002 creates transaction details to submit to blockchain 1006, and submits transaction 1008 to blockchain 1006 and step S1018. In step S1020, blockchain 1006 notifies observers the presence of the new transaction 1008 which, in an exemplary embodiment, includes alerts to relevant nodes (not shown).

In step S1022, blockchain 1006 creates block 1012 which may include a collection of transaction 1008. In an exemplary embodiment, block 1012 is created after a configurable consensus criteria has been met. For example, such criteria may include, without limitation, a specified time limit after a previous block has been added, a determination that a specified number of minimum transactions are ready to be processed, and/or other mechanisms for triggering block creation. In step S1024, blockchain 1006 is configured to calculate the Merkle Root. In an exemplary embodiment, blockchain 1006 utilizes hashing to perform the Merkle operation on a transaction tree, thereby arriving at a single hash representing the entire transaction graph.

In step S1026, blockchain 1006 notifies that a new block (i.e., block 1012) has been created for the particular node associated with the new block. In step S1028, blockchain 1006 utilizes the configurable consensus mode in order to determine and achieve network agreement as to which block is to be accepted as the next block in blockchain 1006. Such network agreement may be achieved, for example, by utilization of algorithms including, without limitation, a calculation of the most transactions in a block, a voting operation between the nodes, a fiat from a central evaluation source, the maximization of values of weighted attributes of transactions, or by combinations of one or more of these algorithms. In step S1030, blockchain 1006 generates a notification for observers of the achieved agreement, and transmits a notification to distributor 1010 in step S1032.

Hardware/Software Binding for Virtualized Environments, Software-Based Infrastructure A key goal of virtualized environments is to allow specialized software to be implemented on generalized hardware. However, some hardware may not be deployed in locations (physically, logically, or geographically) suitable for secure operation of some software. Moreover, some software should only be run on particular hardware, or in cooperation with additional software packages on particular hardware.

Therefore, in accordance with the embodiments described herein, the present inventors have further developed a cryptographic binding mechanism that ensures particular software can only be run on particular hardware. This cryptographic binding mechanism is of particular advantageous use with respect to the present embodiments with respect to providing further security to receipts using blockchain. Such implementations for blockchain embodiments may further incorporate variations including, without limitation: single level challenges; multi-level (recursive) challenges; and durations of challenge validity.

The present inventors further envision that such cryptographic binding mechanisms are of further utility with respect to encryption as a domain or VM separation mechanism, and also with regard to use of the hardware/software bindings as a seed for encryption scheme, including, but not limited to, the encryption schemes described above.

Frictionless Content

Figure 11:
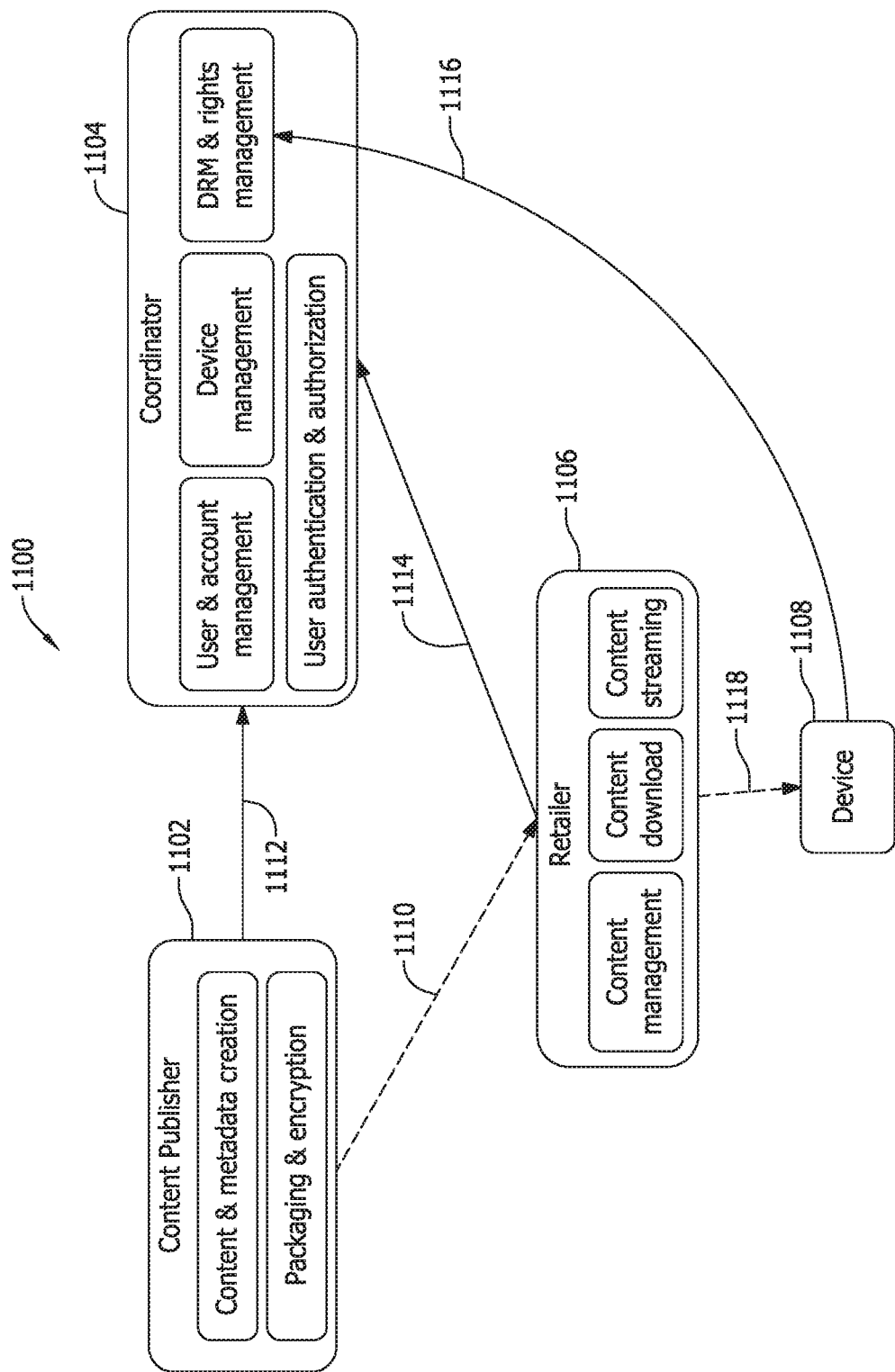
FIG. 11 is a schematic illustration of a conventional blockchain ecosystem.

FIG. 11 is a schematic illustration of a conventional blockchain ecosystem 1100, which may, for example, represent a digital entertainment content ecosystem. Ecosystem 1100 includes a content publisher 1102, a coordinator 1104, a retailer 1106, and at least one electronic device 1108. Content publisher 1102 is responsible for content and metadata creation, and also packaging and encryption of the published content. Coordinator 1104 is responsible for user and account management, device management, digital rights management (DRM), and user authentication and authorization. Retailer 1106 is responsible for content management, as well as content downloads and content streaming to device 1108.

In operation, metadata, content, and keys 1110 are transferred from content publisher 1102 to retailer 1106. Content metadata 1112 is transferred from content publisher 1102 to coordinator 1104. Rights token 1114 is transferred from retailer 1106 to coordinator 1104, device 1108 obtains license acquisition 1116 from coordinator 1104, and fulfillment 1118 occurs between retailer 1106 and device 1108.

Conventional ecosystem 1100 requires a common digital content container and encryption with multiple DRMs, content portability across compliant consumer devices, and a centralized content rights coordinator. One drawback from conventional ecosystem 1100 is that the container and DRM technology predated the eventual technological standards experienced today. Further drawbacks include: unspecified interfaces (represented by dashed lines, with solid lines representing interfaces designated by conventional ecosystem 1100) require unique business-to-business deals between content producers, retailers, and users (e.g., by device 1108); and the centralized coordinator and necessary business-to-business deals still present limits to usefulness of conventional ecosystem 1100.

Figure 12:
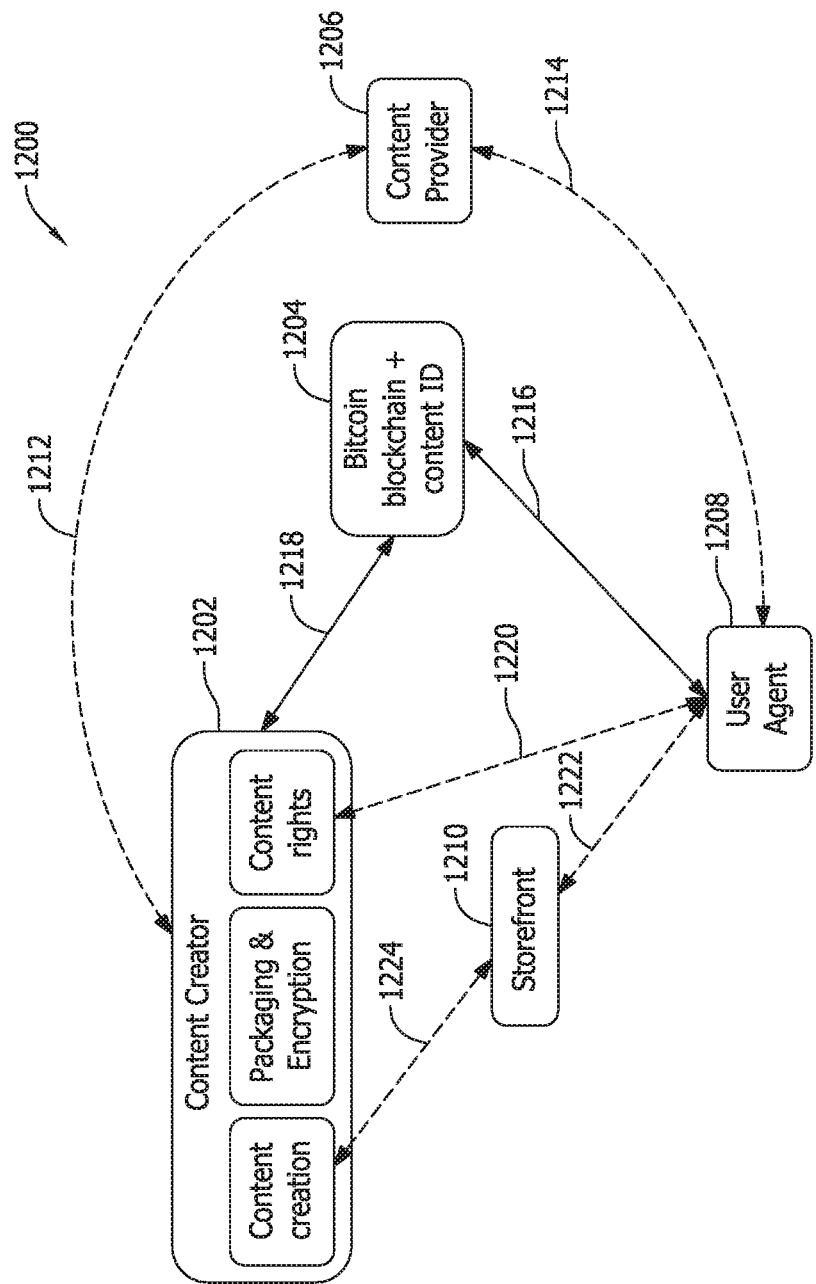
FIG. 12 is a schematic illustration of an exemplary blockchain ecosystem, according to an embodiment.

FIG. 12 is a schematic illustration of an exemplary blockchain ecosystem 1200, according to an embodiment. Ecosystem 1200 includes a content creator 1202, a blockchain 1204, a content provider 1206, a user agent 1208, and a storefront 1210. Ecosystem 1200 represents an implementation of "frictionless content" to address the shortcomings of conventional ecosystem (i.e., ecosystem 1100, FIG. 11). Some advantageous improvements provided by the frictionless content of ecosystem 1200 include, without limitation: DASH, or Dash cryptocurrency, may be substituted for the proprietary media container; implementation of blockchain technology decentralizes the requirement for the conventional coordinator (i.e., coordinator 1104, FIG. 11); and utilization of bitcoin (or an alternative crypto currency) further decentralizes the financial model of the conventional ecosystem.

In operation, content distribution 1212 occurs between content creator 1202 and content provider 1206. Content acquisition 1214 occurs between content provider 1206 and user agent 1208. Content purchase 1216 by user agent 1208 is submitted to blockchain 1204, and blockchain 1204 establishes purchase verification 1218 with content creator 1202. In an exemplary embodiment, user agent 1208 may directly obtain license acquisition 1220 from content creator 1202, and may perform a content browse 1222 from storefront 1210. In the exemplary embodiment, metadata and location information 1224 may be shared between content creator 1202 and storefront 1210. In the example illustrated in FIG. 12, solid lines may represent interfaces governed by blockchain 1204, and dashed lines may represent, for example, a web service or an HTML webpage or web application.

According to the embodiment of FIG. 12, content creator 1202 may be responsible for content creation, packaging and encryption of the content, and also establishment of the rights to use, license, and/or distribute the content. Blockchain 1204 is responsible for cryptocurrency management and content ID. In an exemplary embodiment, ecosystem 1200 utilizes frictionless content to resolve the high barriers to participation experienced according to the conventional ecosystem. For example, present business-to-business requirements typically allow only the largest content creators, distributors, and consumer device vendors to participate. Content is not generally portable across user devices, and usage rights for the content tend to be rigid.

According to the exemplary embodiment depicted in FIG. 12, on the other hand, content distribution may utilize blockchain and DRM technology to remove such participation barriers, and also decentralize financial and rights management such that enable even the smallest content creators may participate within ecosystem 1200 on substantially more equal footing with the significantly larger creators and distributors. Embodiments according to ecosystem 1200 further allow content to be portable across substantially all consumer devices, and the relevant usage rights can be expressed in software enabling dynamic distribution models.

As described in the embodiments above, blockchain technology provides an advantageous payment system and public ledger of content transactions. Such technology further may utilize the use of, without limitation: colored coins, for purchased content metadata on the ledger; DASH, for a universally supported content container; HTML encrypted media extensions and clear key content; and also decryption schemes of universally supported content protection. The frictionless content of ecosystem 1200 is further advantageous to potential new distribution models, including, but not limited to: secondary content markets where content rights can be resold; dynamic aggregation, including an aggregator financial transaction wrapping the content transaction; and "smart content contracts" involving programmatic usage rights that more efficiently may replace paper contracts.

In the exemplary embodiment, implementation of ecosystem 1200 allows for significant simplification of storefront 1210, easier use of packaging and encryption by content creator 1202, a clear key DRM license server, and JavaScript implementation of rights and key management on top of the clear key DRM.

Figure 13:
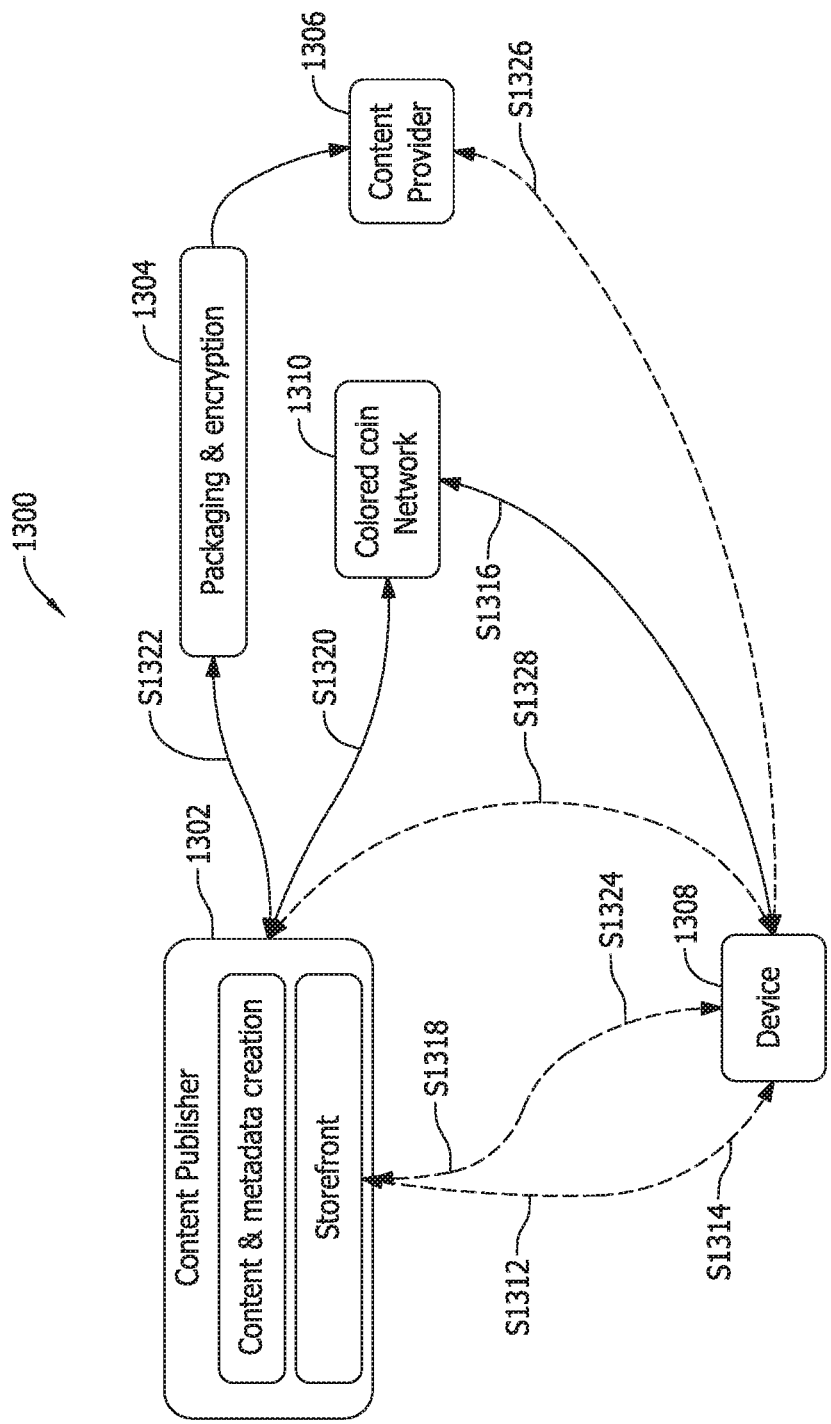
FIG. 13 is a schematic illustration of an exemplary message flow that can be implemented with the ecosystem depicted in FIG. 12.

FIG. 13 is a schematic illustration of an exemplary message flow process 1300 that can be implemented with the ecosystem depicted in FIG. 12. Process 1300 includes a content publisher 1302 responsible for content and metadata creation and storefront management, a packaging and encryption service 1304, a content provider 1306, an electronic device 1308, and utilizes a blockchain 1310, such as a colored coin network.

In operation, process 1300 may execute the following steps, which are not necessarily required to be in the order listed, except where so clearly designated as being dependent on a prior step. In step S1312, electronic device 1308 performs a content search of the storefront of content publisher 1302. In step S1314, content publisher 1302 transmits a blockchain address and/or currency cost to electronic device 1308. In step S1316, presuming a user of electronic device 1308 chooses to purchase content from content publisher 1302 and accepts the transmitted cost, electronic device 1308 initiates a blockchain transaction, which may be a colored coin transaction to blockchain 1310, including the content ID, and payment for the content.

In step S1318, the content ID and other identifications are transferred between content publisher 1302 and electronic device 1308. In step S1320, the transaction is verified between content publisher 1302 and blockchain 1310. In step S1322, the purchased content is pushed from content publisher 1302 to packaging and encryption service 1304. In step S1324, a URL for the content is shared between content publisher 1302 and electronic device 1308. In step S1326, electronic device 1308 gets the content from content provider 1306. In step S1328, a license request and relevant license keys are shared between content publisher 1302 and electronic device 1308. In the exemplary process 1300 depicted in FIG. 13, solid lines represent interfaces governed by blockchain 1310, dashed lines may represent interfaces utilizing a web service, or HTML webpages/web applications (including HTML5), and double lines may represent unspecified interfaces.

Figure 14:
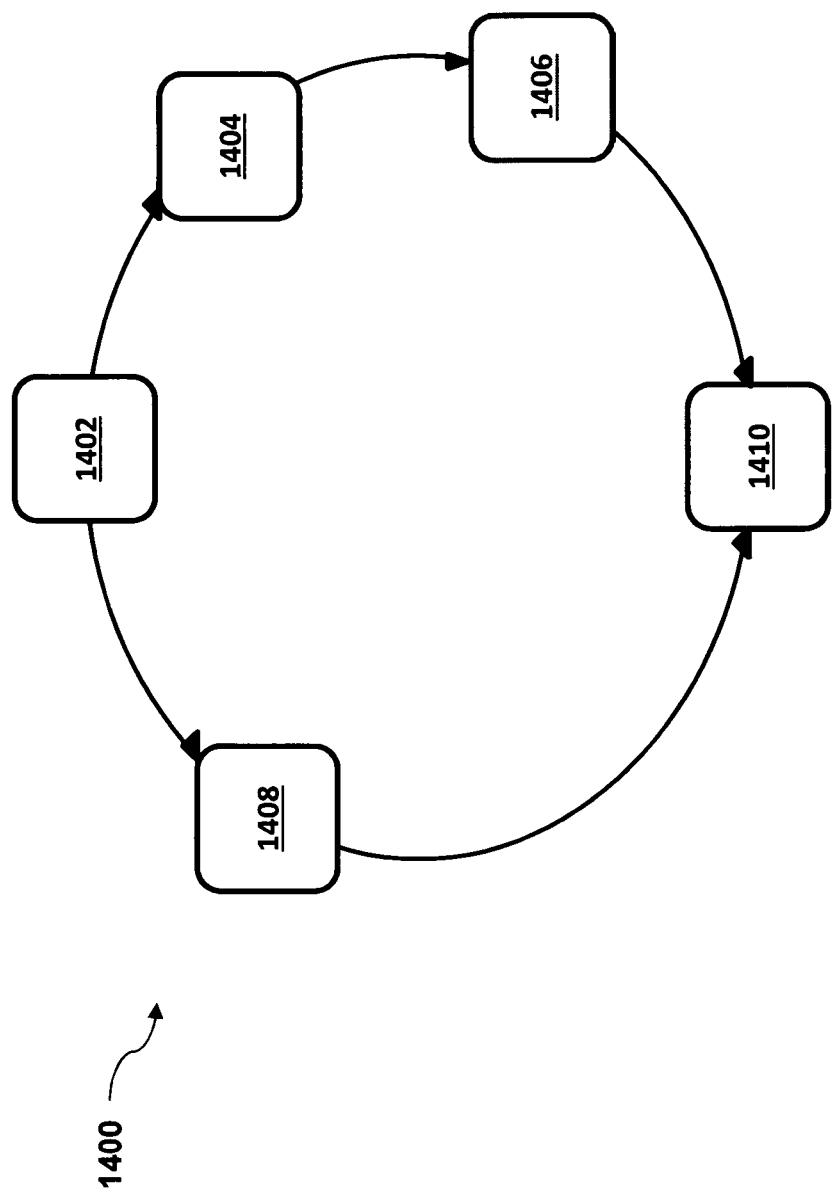
FIG. 14 is a schematic illustration of a conventional vertical blockchain ecosystem.

FIG. 14 is a schematic illustration of a conventional vertical blockchain ecosystem 1400. Ecosystem 1400 includes a content creator 1402, a content packager 1404, a content deliverer 1406, a retailer 1408, and at least one user electronic device 1410. Ecosystem 1400 is similar to ecosystem 1100, depicted in FIG. 11, except that system 1400 provides vertically integrated services. Retailer 1408 is not responsible for content management or delivery to user electronic device 1410. Blockchain technology is implemented within ecosystem 1400 merely to verify payment. That is, a blockchain processor does not include content as currency.

In operation, a purchase transaction is initiated from user electronic device 1410 to retailer 1408, and then metadata, content, rights tokens, and/or keys are transferred from content creator 1402 to user electronic device 1410 through content packager 1404 and content deliverer 1406. In an exemplary embodiment, a software application on user electronic device 1410 interacts with a web application of retailer 1408. Vertically integrated ecosystem 1400 otherwise operates similarly to ecosystem 1100. Ecosystem 1400, however, represents a paid digital media ecosystem having participation barriers similar to those described above with respect to FIG. 11. Smaller content creators and distributors have difficulty selling content directly to end users due to the need to utilize a third party intermediary for content delivery network (CDN) and DRM services.

Performance by the third party intermediary is difficult to verify, and smaller creators/distributors generally have little leverage with which to negotiate terms. Other such third party intermediary barriers include: use of a centralized rights store, where shared rights and portability across multiple devices and/or retailers are limited; unspecified payment terms or fixed payment models; limited fulfillment and device support options; requirements to use particular proprietary technology; difficulty utilizing ecosystem offline; and lack of rights controls or verification on end devices.

More particularly, conventional vertically integrated distribution processes for monetizing digital media require fixed costs that limit participation, pricing, usage rights, and media use. Examples include cable networks, large-scale online media providers, digital media distributors, and online sites for displaying and distributing user-generated content. The content creators have little control over the content distributed through these channels, and the content users face a variety of restrictions in their use of purchased content. Additionally, the costs associated with large distribution channels limit their availability to only content that is considered high-value. Existing smaller distribution channels have lower, but still fixed costs, and the array of media that is distributed through the smaller distribution channels limited. Pricing and usage flexibility is limited for both large and small distribution channels.

Figure 15:
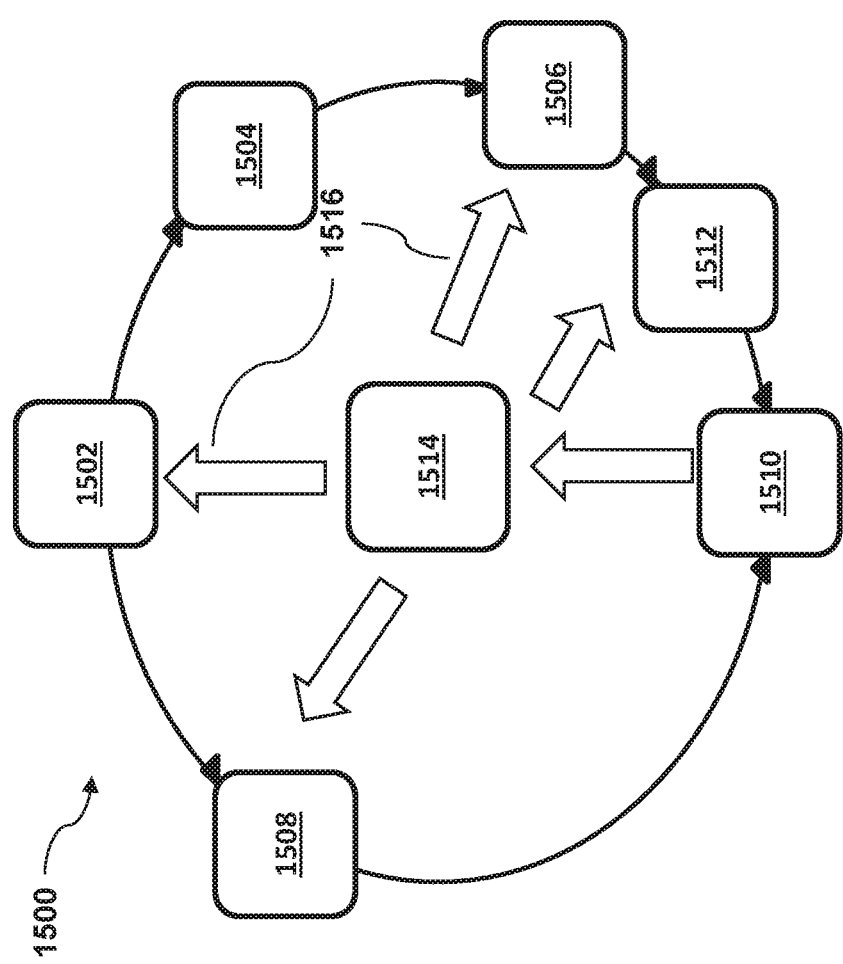
FIG. 15 is a schematic illustration of an exemplary vertical blockchain ecosystem, according to an embodiment.

FIG. 15 is a schematic illustration of an exemplary vertical blockchain ecosystem 1500, according to an embodiment. Similar to ecosystem 1400 (FIG. 14), ecosystem 1500 includes a content creator 1502, a content packager 1504, a content deliverer 1506, a retailer 1508, and at least one user electronic device 1510. Different from ecosystem 1400, ecosystem 1500 further includes a DRM 1512 and a blockchain 1514. In an embodiment, content packager 1504, content deliverer 1506, and DRM 1512 are integrated portions of a single content creator service (not separately numbered). Ecosystem 1500 represents an alternative implementation of frictionless content, or frictionless media, to address the shortcomings of ecosystem 1400. That is, blockchain 1514 functions as a shared database to verify not only financial payments, but also content usage and rights.

Ecosystem 1500 is similar to ecosystem 1200 (FIG. 12) in that ecosystem 1500 is also capable of utilizing DASH cryptocurrency, HTML encrypted media extensions and clear key content, JavaScript, decryption schemes, a decentralized coordinator and financial model, and utilization of bitcoin or alternative cryptocurrencies. For simplicity of explanation, other shared similarities with ecosystem 1200 are not illustrated in FIG. 15.

In operation, blockchain 1514 functions as the "third party" intermediary by providing the shared database to confirm verification 1516 of payment and content distribution to each of the several parties. More particularly, a blockchain transaction utilizing blockchain 1514 includes the rights for a content asset purchased through the transaction, such as a rights expression, and/or an asset ID. A transaction utilizing ecosystem 1500 is initiated when a user (i.e., through user electronic device 1510) chooses to purchase content from retailer 1508, as described further below respect to FIGS. 16 and 17. Similar to ecosystem 1200 (FIG. 12), content creator 1502 and the content creator service (1504, 1506, 1512) may be responsible for content creation, packaging, and encryption, and also establishment of the rights to use, license, and/or distribute the content. Blockchain 1514 is responsible for cryptocurrency management and content ID.

Through use of the advantageous frictionless media ecosystem 1500, essentially any set of parties are able to execute a financial transaction without first having to establish prior trust with an intermediary, or an existing relationship with a trusted third party. As with the embodiments described above, ecosystem 1500 is further capable of realizing implementation of blockchain technology to include digital assets (e.g., content ID, commitment to deliver a service, and associated rights) as part of the blockchain transaction. Additionally, according to this exemplary embodiment, content protection can be based on publicly viewable rights, and the transaction database of blockchain 1514 is distributed, secure, immutable, transparent, and visible to all parties.

A frictionless media ecosystem according to FIG. 15 thereby decentralizes the paid media distribution model by eliminating, or reducing the significance of, a third party intermediary digital media transactions with respect to payment, rights, and verification. Content creators may advantageously utilize ecosystem 1500 to sell content directly to users, and then verify content usage by the users.

Figure 16:
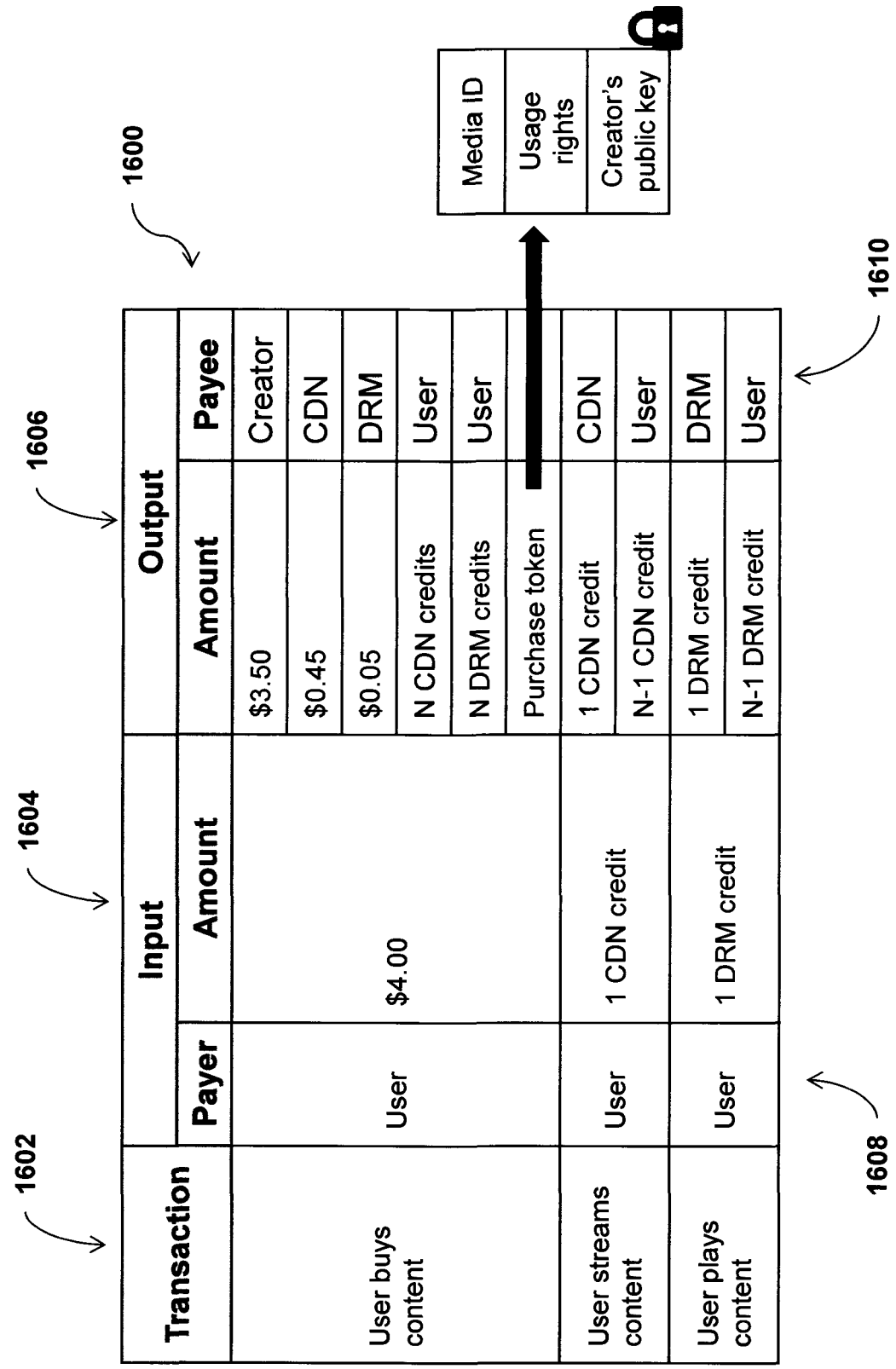
FIG. 16 illustrates a transaction table for exemplary transactions performed utilizing the blockchain of the ecosystem depicted in FIG. 15.

FIG. 16 illustrates a transaction table 1600 for exemplary transactions 1602 performed utilizing blockchain 1514 of ecosystem 1500, as depicted in FIG. 15. In accordance with the embodiments described above, each of transactions 1602 may be a CAC transaction. For each transaction 1602, blockchain 1514 receives payer inputs 1604 from a content user 1608, and transmits payee outputs 1606 to one or more payees 1610. In the example illustrated, a user (e.g., user electronic device 1510, FIG. 15) purchases from a content creator (e.g., content creator 1502, FIG. 15) N number of views/uses/streams of media content for $4.00. In an exemplary embodiment, N is a predefined number set by the content creator (or distributor) to limit the number of times a user, or secondary purchaser of the content from the user, may experience the purchased media content. In one example, in the event that the content creator may desire that a user have effectively "unlimited" usage of the content, N may be set to an arbitrarily large value.

In operation, as illustrated in FIG. 16, when the user purchases content (e.g., purchase transaction 1702, FIG. 17, below), blockchain 1514 receives $4.00 of cryptocurrency as payer input 1604. Blockchain 1514 may then distribute the $4.00 cryptocurrency payment among several payees 1610 according to predefined distribution agreements and has payee outputs 1606. In the example shown, the content creator receives $3.50, the CDN (e.g., CDN 1708, FIG. 17, below) receives $0.45, and the DRM (e.g., DRM 1512, FIG. 15) receives $0.05. According to an exemplary embodiment, utilizing the content as currency model of the present disclosure, blockchain 1514 further distributes to the user, as payee outputs 1606, N number of CDN credits and N number of DRM credits. In an embodiment, blockchain 1514 additionally creates a purchase token as a payee output 1606. The purchase token may, for example, include one or more of a media ID, usage rights, and a public key of the content creator, as described above.

Using a similar process, when a user wishes to stream purchased content (e.g., access transaction 1704, FIG. 17, below), for example, blockchain 1514 receives 1 CDN credit from the user (as payer 1608), and then transmits as payee outputs 1606 1 CDN credit to the CDN and N-1 CDN credits to the user. That is, blockchain 1514 verifies to the CDN that the content has been streamed one time, while verifying to the user that the user has one fewer streams available of the original N purchased. The process is effectively the same when a user wishes to play purchased content (e.g., play transaction 1702, FIG. 17, below) on an electronic device (e.g., user electronic device 1510, FIG. 15). When the purchased content is played, blockchain 1514 receives 1 DRM credit from the user, and then transmits 1 DRM credit to the DRM and N-1 DRM credits to the user.

According to the advantageous systems and methods herein, the media credits (CDN and/or DRM) are themselves used as some of the cryptocurrency of blockchain 1514. The immutable nature of blockchain 1514 therefore provides a decentralized payment system and public ledger of content transactions and rights. Content sellers and buyers, as well as other ecosystem parties, are thus able to more easily monetize media distribution without having to establish prior and/or untrusted business relationships. By establishing a predetermined number N of verifiable content uses, a user may freely use or sell the purchased content, and over a number of devices or technologies, and the content creator may nevertheless easily verify each such use. By defining a finite number of content usages, a content creator may also more easily prevent or limit theft or unauthorized use of its intellectual property.

Figure 17:
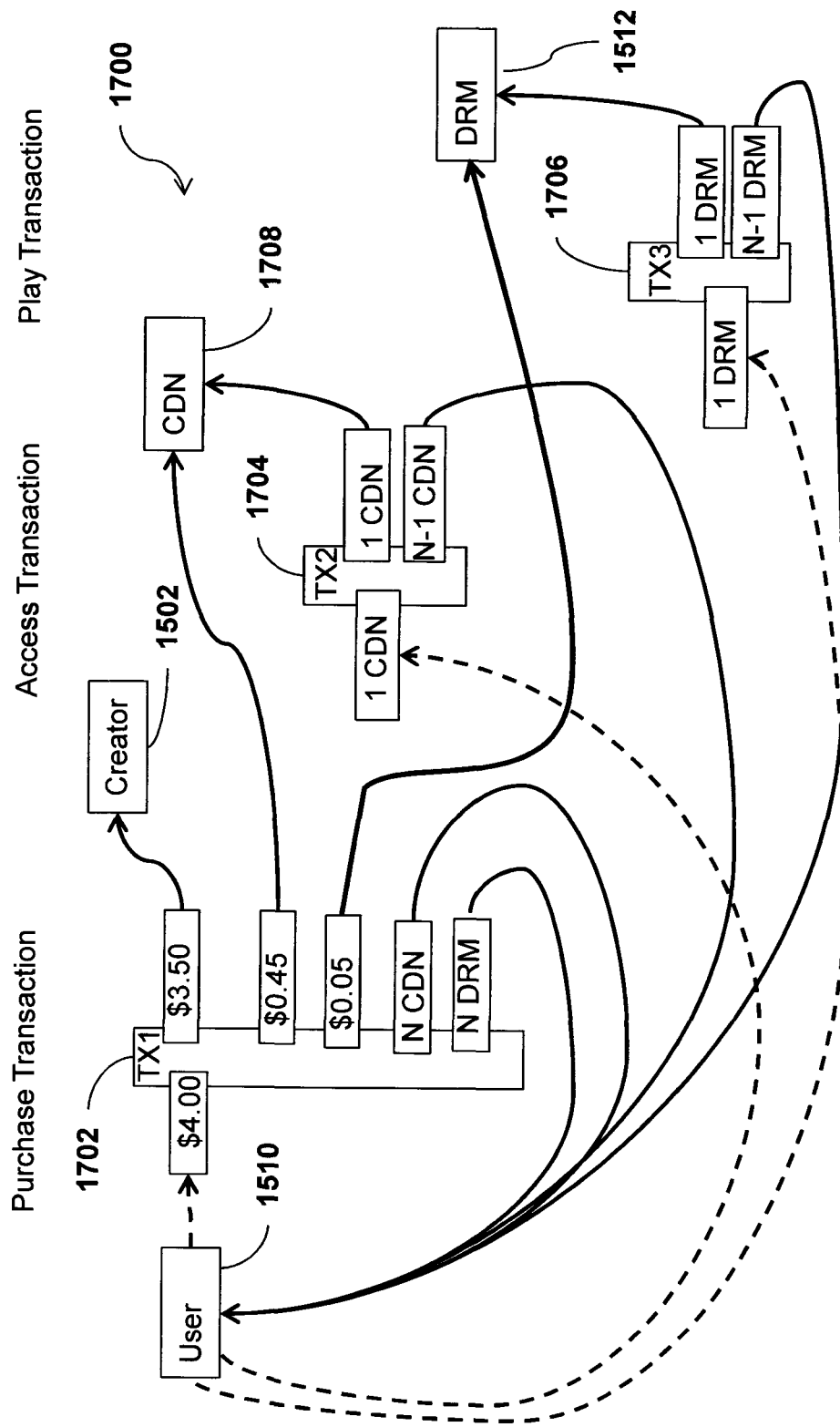
FIG. 17 is a schematic illustration of an exemplary flow process implementing the blockchain ecosystem depicted in FIG. 15 for the transactions depicted in FIG. 16.

FIG. 17 is a schematic illustration of an exemplary flow process 1700 implementing blockchain ecosystem 1500, depicted in FIG. 15, for transactions 1602, depicted in FIG. 16. In an exemplary embodiment, flow process 1700 includes one or more of a purchase transaction 1702, an access transaction 1704, and a play transaction 1706, each utilizing blockchain 1514 for verification. In the example illustrated in FIG. 17, dashed flow lines represent payer inputs 1604 (FIG. 16) and solid flow lines represent payee outputs 1606.

In an exemplary embodiment, purchase transaction 1702 is created by user electronic device 1510 (e.g., through a software application) to purchase content from content creator 1502. Once purchase transaction and 1002 is initiated, a license server (not shown) of DRM 1512 verifies that user electronic device 1510 initiated purchase transaction 1702. Content creator 1502 then creates a purchaseToken, which may include one or more of an asset ID, content rights, a public key of user electronic device 1510, a user authentication token, a signature of content creator 1502, and a public key of content creator 1502. Content creator 1502 then signs the purchaseToken with a private key. In an exemplary embodiment, the purchaseToken is verified as payee output 1606 by blockchain 1514 (e.g., OP_RETURN output in a payment system transaction, such as bitcoin).

After the purchase transaction is completed, a user of user electronic device 1510 may use the purchased content by implementing access transaction 1704 and/or play transaction 1706. In an exemplary embodiment, to initiate either transaction 1704, 1706, the user transmits a license request including a useToken (not shown). In an exemplary embodiment, useToken is created by user electronic device 1510, and may include one or more of a transaction ID, the purchaseToken, a user authentication token, and a user signature. In an embodiment, the useToken may be signed with a private key of the blockchain transaction 1704 and/or 1706. Once received, DRM 1512 verifies the useToken signature with the public key, contained in the purchaseToken, of content creator 1502 according to the respective transaction referenced. These purchase and use tokens are embedded by blockchain 1514 in the respective transaction, and thus codify the link between the respective transaction and each use of the purchased content.

According to this advantageous frictionless media blockchain ecosystem, the enhanced flexibility of use and verification of purchased content renders the ecosystem additionally applicable useful to secondary markets, for example, where users of purchased content may legitimately sell/transfer media rights to one another. The embodiments disclosed herein allow the content creator to easily track and verify the usage of its distributed content, as well as the payments resulting therefrom, without requiring a third party intermediary. The ease and flexibility of the systems and methods disclosed herein allow the parties in the ecosystem to operate more independently of one another, and encourage competition among content distributors of various sizes.

The present systems and methods further allow more reliable portability of content without sacrificing ease of verification. According to the advantageous frictionless media ecosystem, a common encryption scheme may be implemented for multiple DRMs, online retailers may utilize a significantly simplified storefront for content purchase playback applications, and a single blockchain purchase transaction can be easily executed with multiple payees. By utilizing a shared database of the blockchain, the content creators, users, and delivery/license servers may all easily access transaction information, whereas only the users need to create the transactions.

Figure 18:
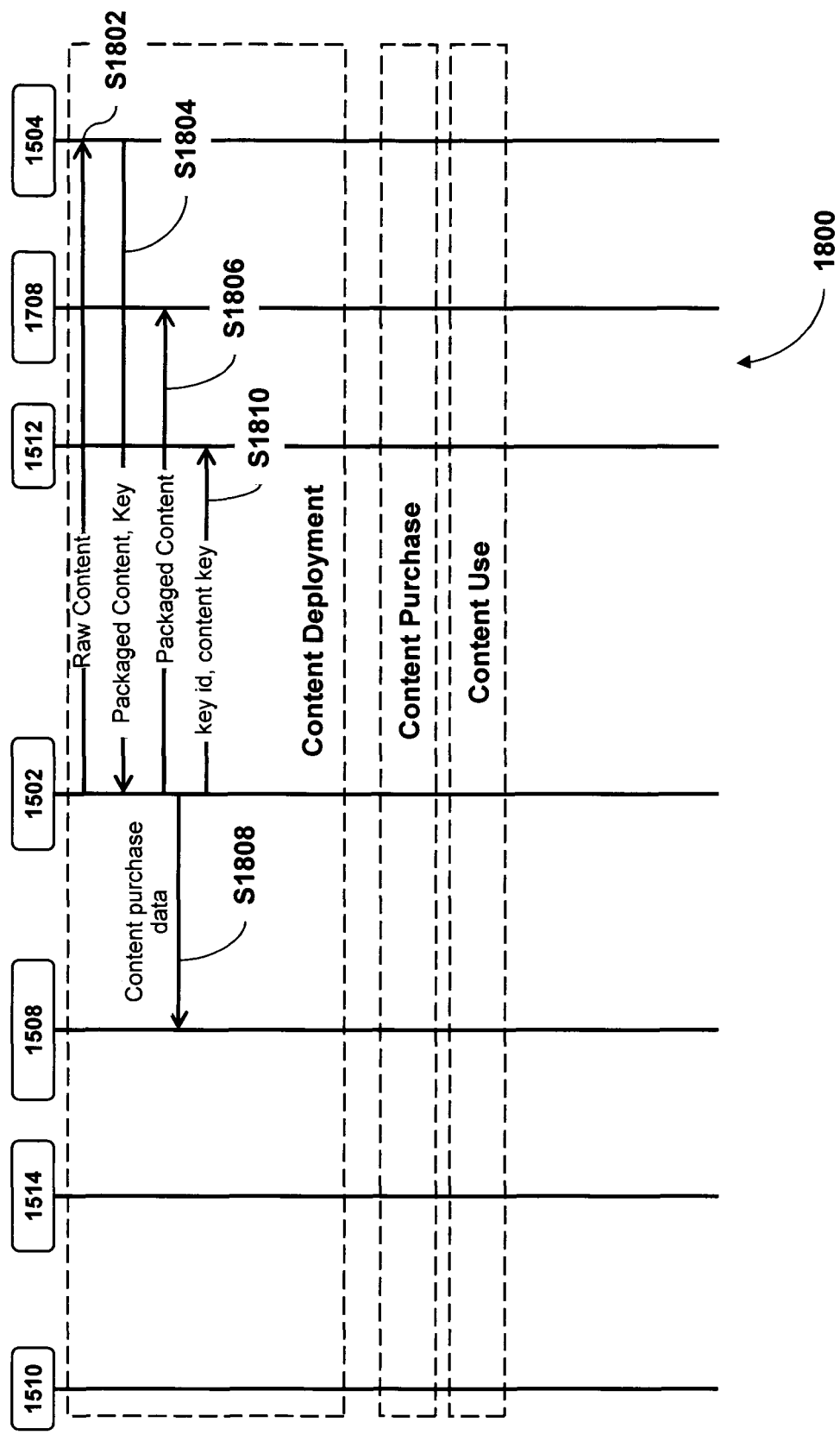
FIG. 18 is a sequence diagram illustrating an exemplary media content deployment that can be implemented with the ecosystem depicted in FIG. 15.

FIG. 18 is a sequence diagram illustrating an exemplary media content deployment process 1800 that can be implemented with ecosystem 1500, depicted in FIG. 15. In an exemplary embodiment, process 1800 is implemented with respect to user electronic device 1510, payment system/blockchain 1514, storefront/retailer 1508, content creator 1502, DRM 1512, CDN 1708, and content packager 1504. For simplicity of explanation, payment system and blockchain 1514 referred to collectively, together. In actuality, the person of ordinary skill in the art will understand that the payment system is the cryptocurrency (e.g., like bitcoin), whereas the blockchain is the technology on which the cryptocurrency is used.

Process 1800 may begin, for example, at step S1802. In step S1802, content packager 1504 receives raw content from content creator 1502. In step S1804, content creator 1502 receives package content, along with at least one key, from content packager 1504. In step S1806, CDN 1708 receives the packaged content from content creator 1502. In step S1808, retailer 1508 receives content purchase data from content creator 1502. In an exemplary embodiment, the content purchase data includes one or more of a URL for CDN 1708, a URL for DRM 1512, a blockchain address for the seller, a purchase price for the packaged content, and the purchase token. As described above, the purchase token may include one or more of an asset ID, content rights, and a public key of content creator 1502, and may also be signed by content creator 1502. In step S1810, DRM 1512 receives the key ID and the content key from content creator 1502.

Figure 19:
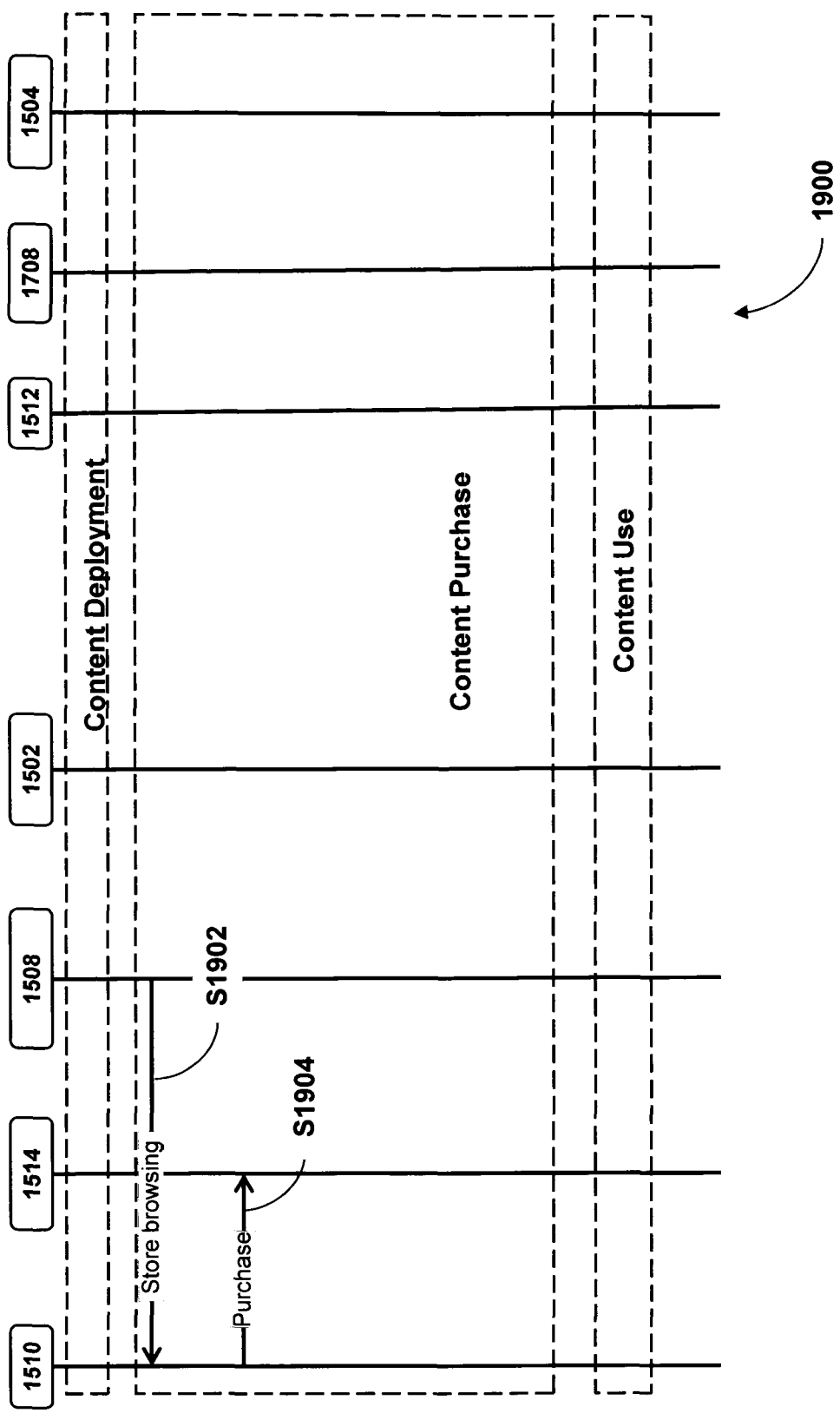
FIG. 19 is a sequence diagram illustrating an exemplary media content purchase that can be implemented with the ecosystem depicted in FIG. 15.

FIG. 19 is a sequence diagram illustrating an exemplary media content purchase process 1900 that can be implemented with ecosystem 1500, depicted in FIG. 15. In an exemplary embodiment, process 1900 is also implemented with respect to user electronic device 1510, blockchain 1514, retailer 1508, content creator 1502, DRM 1512, CDN 1708, and content packager 1504.

Process 1900 may begin, for example, at step S1902. In step S1902, user electronic device 1510 browses content from the storefront retailer 1508. In step S1904, user electronic device 1510 initiates and creates a purchase transaction (e.g., purchase transaction 1702, FIG. 17) with the payment system of blockchain 1514. As described above, and depicted in FIGS. 16 and 17, the user provides payment to blockchain 1514, which is then distributed, according to predetermined agreement, to content creator 1502, CDN 1708, and DRM 1512.

In an exemplary embodiment, the blockchain transaction (purchase transaction 1702 in this example) contains the purchase token (e.g., purchaseToken). According to this example, the user receives one or more colored coins in their user wallet (e.g., payer 1608, FIG. 16) which may then be further used for CDN and DRM credits. By using colored coins in the user's payer wallet of blockchain 1514, the use of CDN and DRM become stateless. That is, a purchase (by the user) is required for each CDN or DRM request. In an alternative embodiment, the respective number of CDN and DRM credits may be encoded directly in the content purchase transaction 1702, and CDN 1708 and DRM 1512 and thereby better able to audit and keep track of how many uses have occurred of the purchased content which may engender payment.

Figure 20:
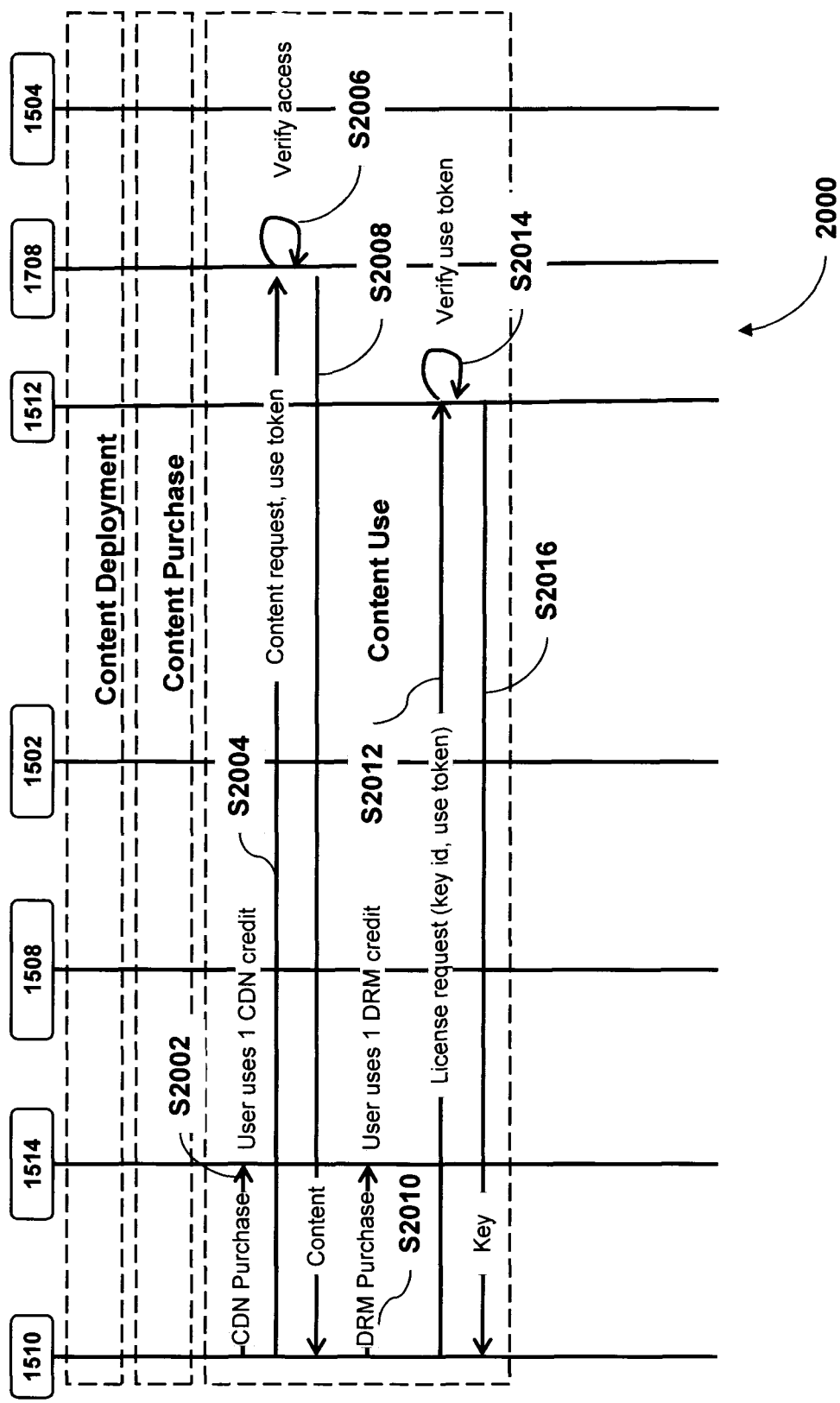
FIG. 20 is a sequence diagram illustrating an exemplary media content usage that can be implemented with the ecosystem depicted in FIG. 15.

FIG. 20 is a sequence diagram illustrating an exemplary media content usage process 2000 that can be implemented with ecosystem 1500, depicted in FIG. 15. In an exemplary embodiment, process 2000 is also implemented with respect to user electronic device 1510, blockchain 1514, retailer 1508, content creator 1502, DRM 1512, CDN 1708, and content packager 1504.

For online streaming usage of purchased content, process 2000 may begin, for example, at step S2002. In step S2002, user electronic device 1510 initiates an access transaction (e.g., access transaction 1704, FIG. 17) with the payment system of blockchain 1514. As described above, and depicted in FIGS. 16 and 17, the user provides 1 CDN credit to blockchain 1514 as payer input 1604. In step S2004, CDN 1708 receives a content request and the use token (e.g., the useToken) from the user electronic device 1510. In an exemplary embodiment, the use token includes an asset transaction ID, a CDN transaction ID, and the purchase token signed with a private key of the transaction used to purchase asset/content. In step S2006, CDN 1708 verifies the use token by one or more of: (1) validating of the token signature with a transaction ID and/or the public key; (2) validating the purchase token signature with the public key of content creator 1502 contained in the purchase token; and (3) verifying the CDN transaction. In step S2008, streaming content is viewable by user electronic device 1510 from CDN 1708.

For device playback usage of purchased content, process 2000 may alternatively begin, for example, at step S2010. In step S2010, user electronic device 1510 initiates a play transaction (e.g., play transaction 1706, FIG. 17) with the payment system of blockchain 1514. As described above, and depicted in FIGS. 16 and 17, the user provides 1 DRM credit to blockchain 1514 as payer input 1604. In step S2012, DRM 12 receives a license request, which may include the key ID and the use token, from the user electronic device 1510. In an exemplary embodiment, the use token includes an asset transaction ID, a DRM transaction ID, and the purchase token signed with a private key of the transaction used to purchase asset/content. In step S2014, DRM 1512 verifies the use token by one or more of: (1) validating use of the token signature with a transaction ID and/or the public key; (2) validating the purchase token signature with the public key of content creator 1502 contained in the purchase token; and (3) verifying the DRM transaction. In step S2016, streaming content is viewable by user electronic device 1510 upon receipt of a key from DRM 1512.

The embodiments described herein significantly improve the security of transactions involving licensed or otherwise encumbered content over electronic networks utilizing blockchain technology. These embodiments facilitate individual customers, users, and subscribers to be active participants in the blockchain network, and not merely just end points of the blockchain. The systems and methods described herein further provide greater ease-of-use at the consumer level, while also allowing content creators/owners and service providers enhanced ability to monitor and audit transactions involving CAC content to which the owners and service providers enjoy continuing rights.

The embodiments disclosed herein further significantly improve the availability and verifiability of CAC transactions using blockchain technology utilizing a frictionless media ecosystem. The frictionless media ecosystem eliminates or substantially reduces all of the fixed costs presently required distribution from the content creator to the user by replacing it with the system that distribute costs for each content distribution instance. The embodiments disclosed herein enable the content creator (of any size) to more easily set its own pricing and media use rights while also providing for the protection media use and content rights across all platforms.

The frictionless media ecosystems illustrated and described herein efficiently leverage cryptocurrency for financial transactions and blockchain technology in order to provide trusted, verifiable accounting, but without requiring a third party intermediary. The systems and methods described herein thereby allow for significantly greater independence among the parties (e.g., content creators, users, deliverers, DRM, etc.), while still providing for easy verification, visibility, and transparency for all parties. The present embodiments further allow for a universal system that can be utilized by any number of existing, or future, technologies that can access the blockchain. Conventional systems (such as HTML5, DASH, Silverlight, Flash etc.), however, are typically limited to the technical environment in which they were created, and may not be utilized with ecosystem platforms. The present embodiments overcome such limitations.

Blockchain Virtualization and Scalability

As described above, blockchain technology fundamentally underlies digital currencies, and enables the new transaction processing solutions featured herein. In some embodiments, blockchain technology utilizes cipher-chaining to cryptographically link blocks of transactions. However, conventional blockchain implementations suffer scalability problems which severely limit their application. The systems and methods described below, on the other hand, implement a novel distributed ledger technology (DLT) environment that supports both spontaneous genesis and controlled elimination of multiple concurrent blockchains among a community of blockchain processors. These embodiments thus provide the benefits of virtualization to ecosystem environments that can utilize distributed ledgers.

A blockchain creates a distributed ledger of transactions that is cryptographically secure from being changed. A blockchain process may include the following steps: (1) transactions are submitted through a protocol to a blockchain network; (2) the submitted transactions are subsequently received by blockchain processors and validated against a list of unspent, that is, spendable, transactions; (3) the received transactions are collected by blockchain processors, queued at a given time interval, hashed using a Merkle process, and then compiled into a group which is then cryptographically hashed to create a block; and (4) the created block is then committed to the blockchain and unspent/spendable transactions are confirmed by adding to a list of unspent transactions. In some embodiments, the process of committing blocks to the blockchain may also involve a consensus process and some form of merit requirement, such as proof-of-work, proof-of-stake, etc. Security of a blockchain can be typically achieved through three particular mechanisms: (i) the computational complexity necessary to create a block and commit it to the blockchain; (ii) the "height" of the blockchain, that is, how many blocks are contained within the chain; and (iii) the size of the consensus pool, that is, the number of processors, participating to create the blockchain as a distributed ledger.

Figure 21:
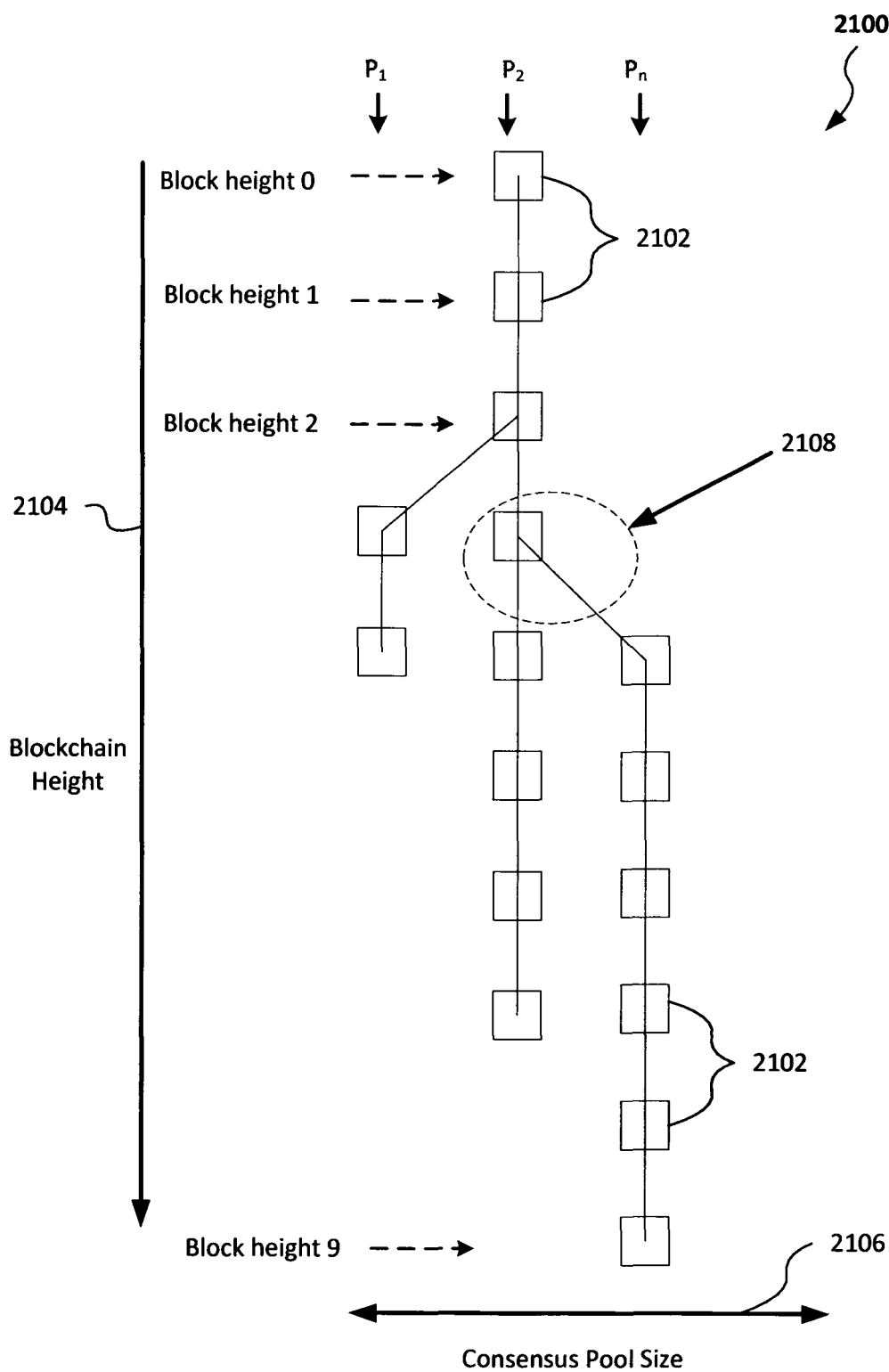
FIG. 21 is a schematic illustration of an exemplary blockchain implementation having a plurality of participating processors.

FIG. 21 is a schematic illustration of an implementation of an exemplary blockchain 2100. Blockchain 2100 includes a plurality of individual blocks 2102 having a blockchain height 2104 and a consensus pool size 2106 having a plurality of participating processors $P_1, P_2, \ldots P_N$. In the exemplary embodiment illustrated, blockchain 2100 utilizes the three security mechanisms described above, namely, (i) a computational complexity 2108 (symbolically represented by dashed ellipse) for creating blocks and committing the created blocks to the blockchain, (ii) blockchain height 2104, and (iii) consensus pool size 2106 including N number of participating processors P to create the blockchain as a distributed ledger.

In an exemplary embodiment, computational complexity 2108 may be achieved through one or more of a variety of cryptographic techniques that are linked block-to-block. Consensus pool size 2106 achieves particular benefits through Byzantine Fault Tolerance, assuming, of course, that the several participants in blockchain 2100 are sufficiently decoupled to reduce the likelihood of collusion between the parties, to a sufficient acceptable degree.

In conventional blockchains, both the scale, and the scalability are limited by the very mechanisms that provide security to the blockchain. For example, the size of the transactions can be limited, as may be the volume of the transactions utilizing the blockchain technology. Additionally, the necessary bandwidth required to connect clients through a network to multiple processors may also be substantial, or significantly limited, and the blocks themselves may also be limited according to the number of transactions which can be included in a single block. Furthermore, individual block size may be further limited with respect to the number of bytes contained within each block. Moreover, the response time to confirm the transaction on the block change can be long, and the size of the block itself can render the block change unwieldy, thereby inflicting unreasonable resource requirements to execute a blockchain. Such resource requirements can also be unreasonably encumbered by a large number of transactions in a valid transaction list, in that it may take significant amounts of time to perform searches in order to validate transactions on a blockchain.

In one embodiment, a difficulty (e.g., a hash target where the hash must be less than a specified number) can be selected to increase the computation required by participants (nodes) to calculate a sufficiently small hash by altering a special aspect of a transaction (the nonce in Bitcoin).

Although a blockchain is theoretically perpetual, at a fundamental level, the notion that a particular blockchain is eternally viable (or even liable for many decades or longer) is likely an unreasonable assumption, even as technology continues to improve. Furthermore, it is an unlikely expectation that all spendable transactions within a blockchain will stand on a queue or list indefinitely. Lastly, it is reasonable to assume, given the state of modern technology, that corruption of a monolithic blockchain is inevitable, and a recovery, or at least a damage containment mechanism, is considered a necessary precaution.

The systems and methods illustrated and described herein advantageously improve all of the scale, the scalability, and security of the given blockchain solution by fostering a concurrent operation of multiple blockchains operating independently or co-dependently among a consensus pool. As described herein, such multiple blockchains operating among a particular consensus pool referred to herein as "a blockchain forest." Each distributed ledger of the forest, represented by individual blockchains, is capable of optimizing blockchain features appropriate for a given supported application, such as tuning the transaction size, the block size, the work interval, the consensus size, and the cryptographic algorithm, and the implementation choice. These novel systems and methods are advantageous over conventional alt-coin solutions, such as those that leverage Bitcoin by implementing side chains to effectively overhaul the Bitcoin transaction interface. The embodiments described herein are also different than the Coin Sciences multi-chain solution in that the present embodiments are optimized to support operation of concurrent chains on the same consensus network.

Within this disclosure, the phrases "distributed ledger" and "blockchain" are used. In conventional practice literature, these two concepts are generally deemed to be synonymous. However, within this application, the two different phrases differ in terms of their respective use and implementation. For purposes of the following discussion, the phrase "distributed ledger" refers to how the blockchain is used, that is, as a distributed ledger that proves the facts of a transaction by virtue of being distributed amongst a consensus pool. "Blockchain", on the other hand, refers to the process by which the distributed ledger is created and operated.

Figure 22:
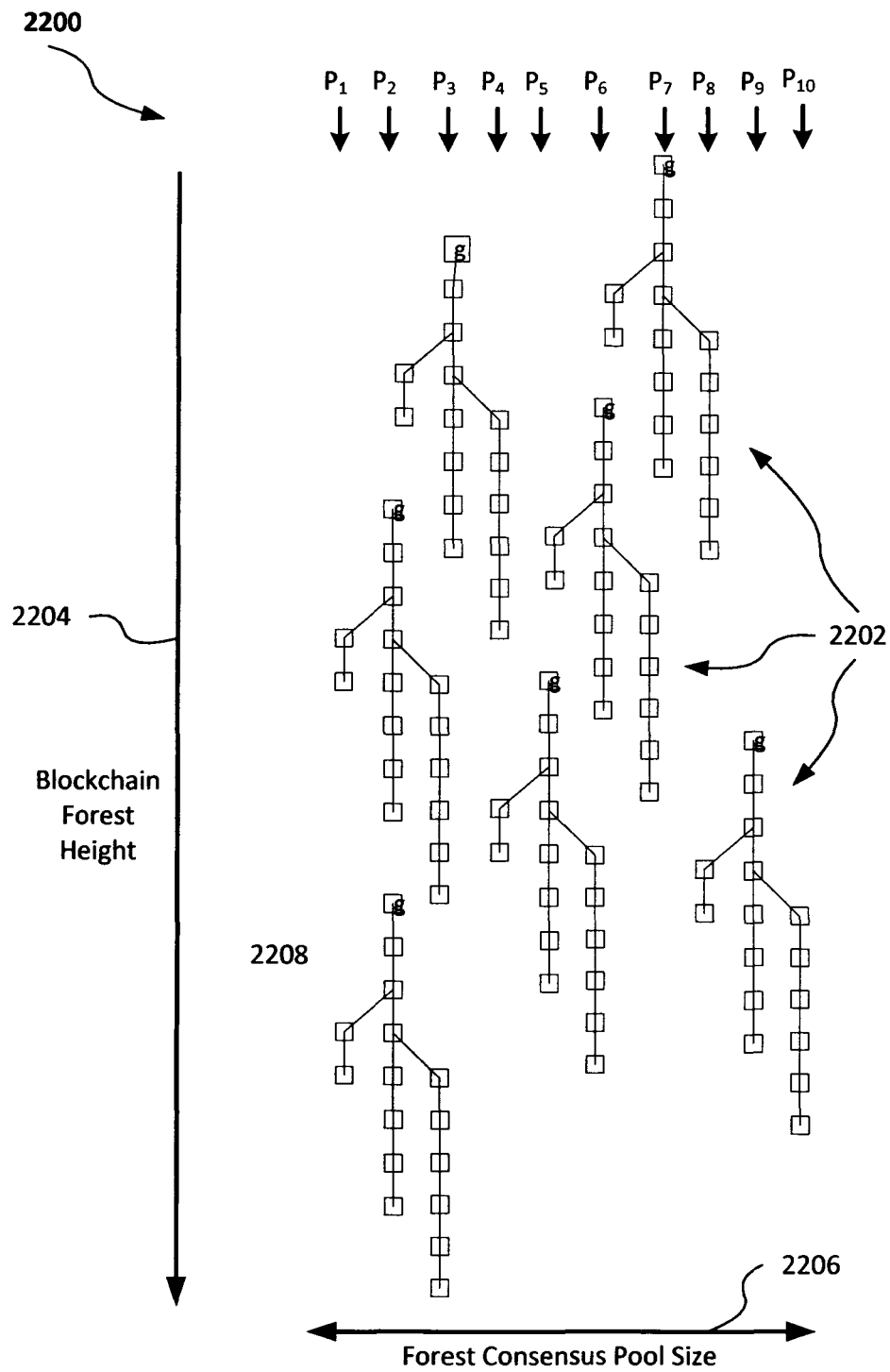
FIG. 22 is schematic illustration of an exemplary blockchain forest having the plurality of participating processors depicted in FIG. 21.

According to the embodiments described herein, the scale, the scalability, and the security of blockchain solutions are further improved by allowing a concurrent operation of multiple blockchains operating independently or co-dependently amongst a consensus pool, as shown in FIG. 22, below.

FIG. 22 is schematic illustration of an exemplary blockchain forest 2200 having the plurality of participating processors P, as depicted in FIG. 21. Blockchain forest 2200 includes a plurality of individual blockchains 2202 that collectively have a blockchain forest height 2204 and a forest consensus pool size 2206 for a plurality of participating processors P1, P2, ... P10. As illustrated in FIG. 22, for ease of explanation, ten processors P are shown, and each individual blockchain 2202 (each having, in this example, a genesis block g, described further below with respect to FIG. 23) is shown to utilize three processors each. Nevertheless, a person of ordinary skill in the art will, in light of the present disclosure and accompanying figures, understand that blockchain forest 2200 may implement more or less than ten processors P, and more or less than seven blockchains 2202, without departing from the scope of the application.

In the exemplary embodiment illustrated, blockchain forest 2200 utilizes three security mechanisms similar to those described above with respect to FIG. 21, namely, (i) computational complexity (not numbered in FIG. 22) for creating blocks and committing the created blocks to the blockchain, (ii) blockchain forest height 2204, and (iii) forest consensus pool size 2206, including N number (ten shown in this example) of participating processors P to create the blockchain as a distributed ledger.

In operation of FIG. 22, each blockchain 2202 of blockchain forest 2200 will effectively produce and maintain a distinct distributed ledger. Each distributed ledger produced thereby will then be able to optimize blockchain features appropriate for a given supported application. Features of blockchain forest 2200 capable of optimization include, without limitation, tuning transaction size, block size, work interval, consensus size, and choice of cryptographic algorithm and implementation. Blockchain forest 2200 thereby realizes his significant advantages over conventional multi-chain systems, in that blockchain forest 2200 supports operation of concurrent chains on the same consensus network. Blockchain forest 2200 is further advantageous over conventional alt-coin solutions, such as those that leverage Bitcoin, by implementing side chains to effectively overhaul the Bitcoin transaction interface. Blockchain forest 2200 thus effectively results in an ecosystem of blockchains 2202 which conveys the security and scalability benefits of virtualization.

Figure 23:
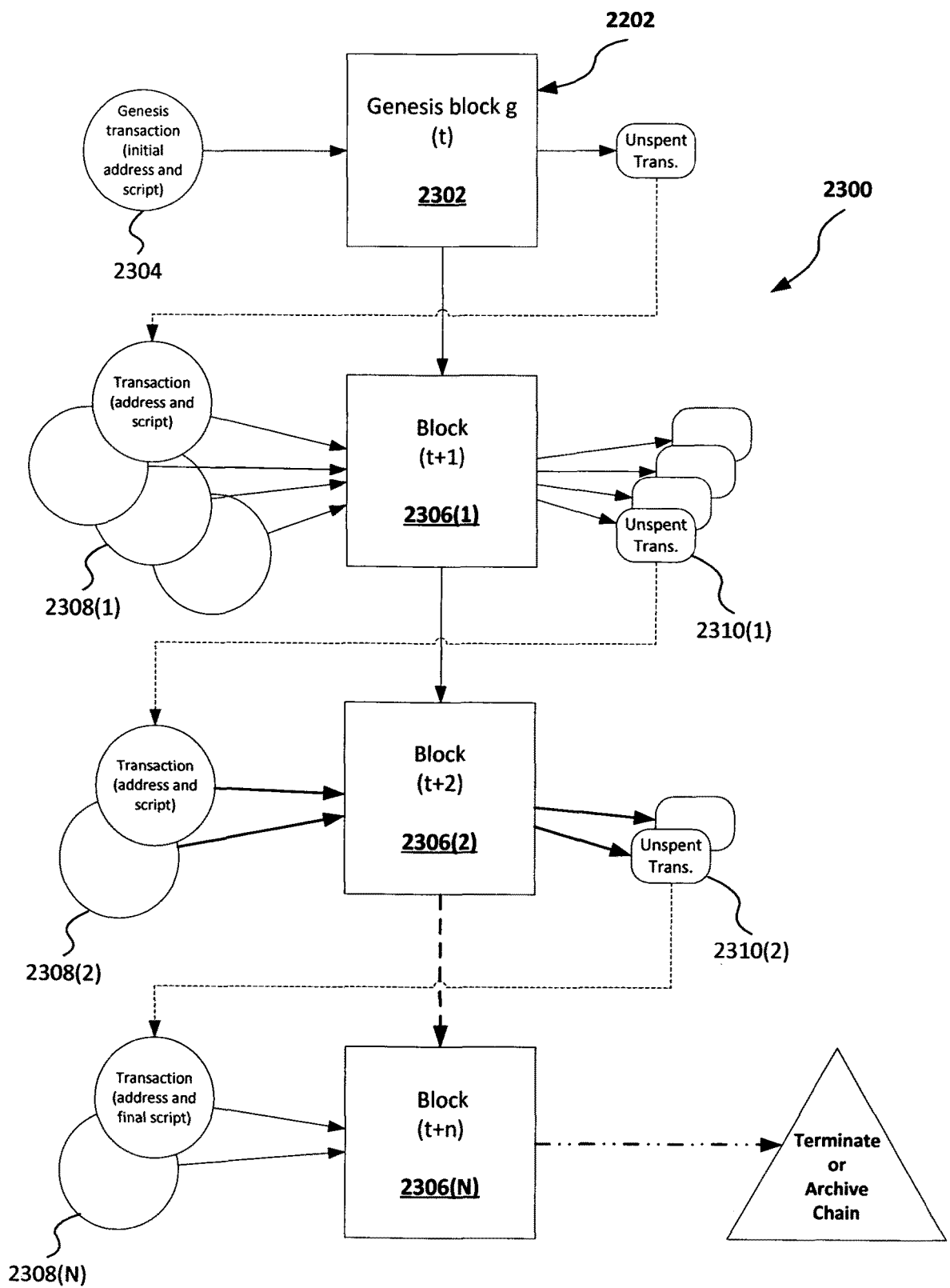
FIG. 23 is a schematic illustration of the lifecycle of an exemplary blockchain embodiment.

FIG. 23 is a schematic illustration of the lifecycle 2300 of an exemplary blockchain 2202 of blockchain forest 2200, depicted in FIG. 22. Blockchain 2202 includes a genesis block 2302 processed to confirm a genesis transaction 2304. As described herein, genesis transaction 2304 indicates a first submission of a digital asset that can create a new distributed ledger, and genesis block 2302 confirms genesis transaction 2304, thereby becoming the root of trust for the ledger through, for example, a Merkle process. Blockchain forest 2200 utilizes these genesis components to implement consensus participation protocols, for example, as well as ledger aging and deletion processes for blockchain 2202, as described further below. In an exemplary embodiment, the ledger aging and deletion processes include an archiving subprocess.

In an exemplary embodiment, creation of a new distributed ledger is coordinated through a consensus participation protocol. The consensus participation protocol is executed between blockchain processors P (FIGS. 21, 22) that represent the available servers that enable the blockchain network. Blockchain forest 2200 further includes a ledger aging and deletion subprocess, which functions to trigger removal of a distributed ledger using the consensus participation protocol.

In an embodiment, blockchain 2202 is created, managed, and terminated for blockchain forest 2200 according to lifecycle 2300, which may include one or more of the following steps. (1) A user (not shown) defines a new asset that will become the basis for a series of related transactions, and then compiles and submits the defined asset as genesis transaction 2304 to a blockchain network. (2) Genesis transaction 2304 propagates through the blockchain network by an implementation similar to the propagation implementations used in conventional in blockchain networks such as Ethereum or Bitcoin. (3) Once received by one or more blockchain processors P (sometimes referred to as "miners" in Bitcoin processing), blockchain processors P will initiate a consensus participation negotiation that solicits additional processors to participate in a new chain. In some embodiments, multiple processors P independently receive genesis transaction 2304 to solve for glare. (4) Using information extracted from genesis transaction 2304, blockchain processors P negotiate a minimal sized (e.g., forest consensus pool size 2206, FIG. 22) consensus pool and key characteristics necessary to create the pool for the defined security requirements. In an exemplary embodiment, the key characteristics include, without limitation, one or more of a transaction payload size, a block size, a processing interval (period of work), a cryptographic algorithm selection, and ledger aging and deletion terms. Once the consensus pool is established, blockchain processors P within the pool negotiate a start time to start blockchain processing of transactions.

(5) Blockchain transaction processing begins with genesis block 2302 (at time t), which confirms genesis transaction 2304, and renders the asset available to subsequent blocks 2306 be spent by subsequent transactions 2308. (6) After each block 2306 is processed, and pending transactions 2308 are confirmed, the ledger aging and deletion terms are consulted. The ledger aging and deletion terms include, without limitation, time (duration or an absolute time), period between transactions (reflecting interest in the asset), and number of unspent transactions 2310 currently valid on the ledger. If the ledger deletion terms are met, blockchain processors will execute the blockchain participation protocol to negotiate termination of the ledger, as described in greater detail further below. The termination of the ledger results in deletion of the ledger from the consensus pool. In some embodiments, where deemed appropriate, the ledger is further archived of to "offline" resources after termination.

As described above, some fundamental components of a virtualized blockchain, or blockchain forest, include genesis transactions, genesis blocks, a consensus participation protocol, and ledger aging and deletion, which may include archiving in some embodiments. A genesis transaction is the first submission of a digital asset that can create a new distributed ledger, and a genesis block confirms the genesis transaction and becomes the root of trust for the ledger by a Merkle process. The creation of a new distributed ledger is coordinated through a consensus participation protocol, and the protocol is executed between blockchain processors representing the available servers that enable the blockchain network. In an exemplary embodiment, the consensus participation protocol utilizes a registration process, as described below, which operates through a centralized or overlay of control elements. Alternatively, the protocol implements a consensus process similar to that utilized by the blockchains themselves. Ledger aging and deletion is a decisions process that triggers removal of a distributed ledger using the consensus participation protocol.

In an exemplary embodiment, a virtualized blockchain, or blockchain forest (e.g., blockchain forest 2200, FIG. 22), is created as follows. Once the need for a new blockchain is discovered, a request for a blockchain is sent to a network of processors. The request may be transmitted, for example, through a registration process (described below), or alternatively, through a distributed consensus process. The request contains necessary details regarding the nature of the blockchain. After the request is sent, processors will consider the request and determine whether or not to participate (e.g., through a registration process or as part of a consensus process). The blockchain (e.g., blockchain 2202, FIG. 22) is then created and begins operation, upon which the requester is notified and appropriate advertisements may be disseminated so that the blockchain may be used by a target user community.

Once operational, the blockchain may continue to operate as long as realistically possible, or as long as it is needed. Monitoring of the operational blockchain may be performed to ensure that predetermined security and performance goals are satisfied. That is, if the monitoring process determines that specific thresholds are not met, a registrant authority or consensus body may intervene to mitigate such shortfalls. Once the blockchain is no longer needed, the blockchain may be terminated, and then optionally archived. According to the multi-thread, multi-process operational embodiments disclosed herein, a significant plurality of blockchains may be simultaneously, or near simultaneously, operating within the same blockchain forest.

In an exemplary embodiment, an archival subprocess is implemented for a blockchain that has been closed to new transactions, that is, the blockchain has been terminated or issued a "destruct" message, as described further below. In the archival subprocess, the entire blockchain is evaluated and verified by the consensus pool as to satisfactory proof of hashing (e.g., equivalence to previously computed hashes), as well as to the version of the blockchain held by a node. Whereas hashing proof requires recalculation of the entire blockchain, version proof may be accomplished more quickly, such as by verifying a hash of the topmost block with that of the version held by the local node.

In the exemplary embodiment, once all participant nodes have verified the blockchain tree computationally, thus agreeing with the final state, the blockchain, the hash, and the archival location(s) are shared across all other blockchains in the blockchain forest. Through this advantageous archival subprocess, the blockchain is verifiably stored and prevented from further alterations, and any subsequent recovery can be computed to determine if the underlying transaction data or blocks have been altered.

Figure 24:
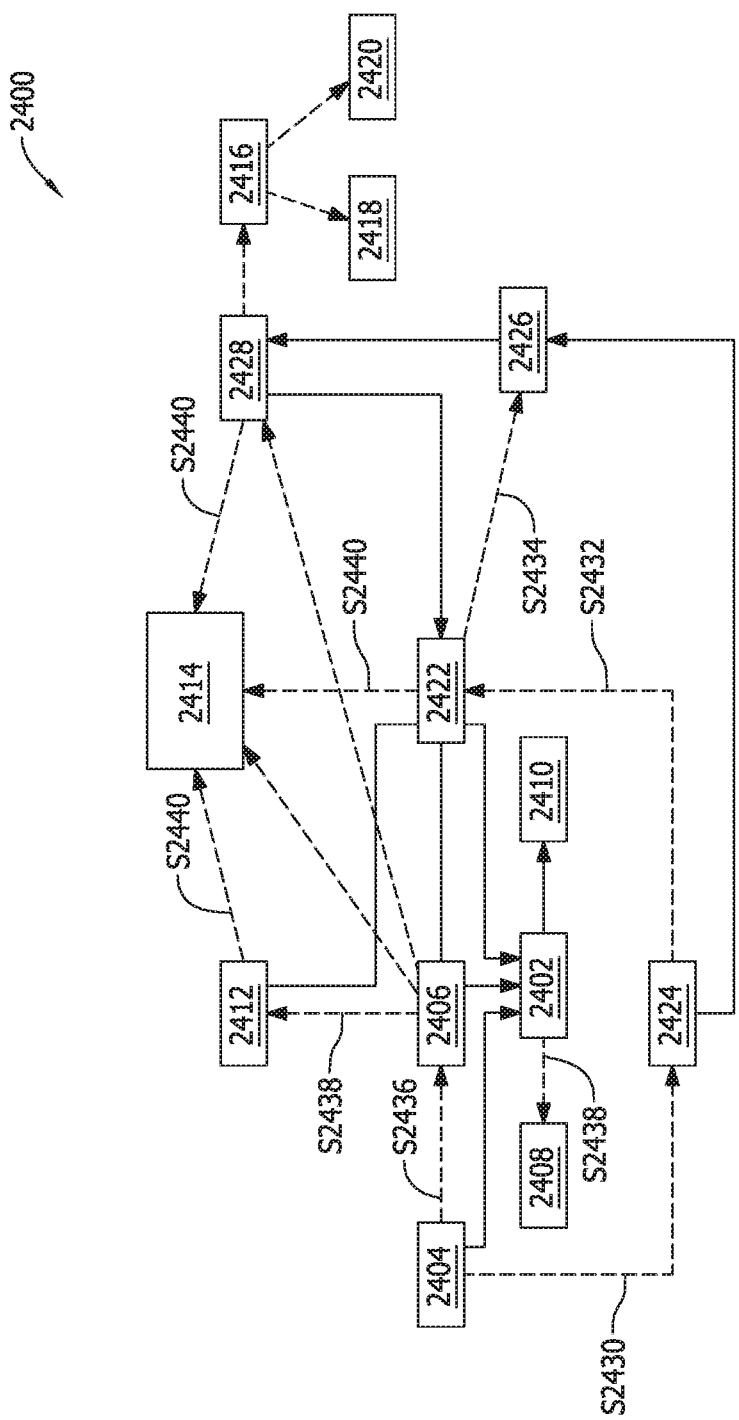
FIG. 24 is a schematic illustration of an exemplary blockchain virtualization utilizing a registration architecture.

FIG. 24 is a schematic illustration of an exemplary blockchain virtualization 2400 for a blockchain forest (e.g., blockchain forest 2200, FIG. 22) utilizing a registration architecture. The architecture of blockchain virtualization 2400 includes an optional node 2402, a user 2404, a broker 2406, a registrar 2408, a network 2410, a consensus pool 2412, an observer 2414, and a destruct unit 2416, which includes a trash 2418 and an optional archive 2420. The virtualization architecture interacts with such conventional elements of blockchain implementations including a processor 2422, for processing a transaction 2424, including individual blocks 2426 of a blockchain 2428. In this example, single instances of processor 2422, transaction 2424, blocks 2426, and blockchain 2428 are illustrated for ease of explanation. Nevertheless, as described above with respect to FIG. 22, a plurality of each of these elements may be present in a blockchain forest according to the present embodiments. In this example, processor 2422 is considered substantively similar to processors P (FIGS. 21, 22), blocks 2426 are similar to blocks 2102 (FIG. 21), and blockchain 2428 is similar to blockchain 2202 (FIG. 22).

In operation of the exemplary embodiment, node 2402 is deemed "type" or "class" employed by user 2404, broker 2406, and processor 2422. User 2404 is the requester of blockchain 2428, and in some embodiments, represents a wallet or the source of transaction 2424. Alternatively, the wallet/source may be separate from user 2404. Broker 2406 functions to process blockchain instantiation requests (described further below). In some embodiments, broker 2406 further functions to manage and/or arbitrate blockchain 2428, in order to ensure that blockchain instantiation or changes to blockchain 2428 meet standards requested by user 2404. Registrar 2408 functions to maintain a list of nodes (e.g., including node 2402). Alternatively, registrar 2408 represents a discovery protocol. Network 2410 represents a collection of all nodes interacting with virtualization 2400, and consensus pool 2412 represents a collection of processors (e.g., processor 2422 that participate with a specific blockchain (2428), is created, through negotiation, by broker 2406. Observer 2414 functions to maintain the state of each blockchain 2428, and additionally to signal when a blockchain 2428 changes, or is no longer needed. Destruct unit 2416 functions to destruct consensus pool 2412 and block new participation from processor(s) 2422 upon termination of blockchain 2428 (described further below).

Virtualization 2400 is illustrated as an exemplary architecture to implement the blockchain forest embodiments of the present disclosure. Other architectures are contemplated by the present inventors, which do not depart from the scope of the embodiments. Furthermore, for ease of explanation, redundant components in virtualization 2400 are not illustrated. Additionally, link level objects/implementations are not shown, nor are security authentication objects/sequences/implementations or other components that might be utilized for security or availability. In the example depicted in FIG. 24, observer 2414 is not illustrated as a node. In some embodiments, observer 2414 may be a node.

In further exemplary operation, virtualization 2400 functions by creating an architecture that allows blockchains to be requested, instantiated, maintained, and destroyed through a registration process. Virtualization 2400 illustrates a registrar (e.g., registrar 2408) and a broker (e.g., broker 2406) to orchestrate the process flows that implement the blockchains (e.g., blockchain 2428). In virtualization 2400, transaction 2424 is submitted in step S2430 by user 2404 and processed in step S2432 by processor 2422 (sometimes referred to as a miner). Processor 2422 aggregates transactions 2424 and creates blocks 2426 in step S2434, which are then added to blockchain 2428. Some of these steps are known in conventional blockchain implementations, however, the present systems and methods and several new and additional elements to allow network 2410 to host multiple blockchains in a blockchain forest.

The addition of broker 2416 to virtualization 2400 is one such element. In an exemplary embodiment, broker 2416 is a broker node, which operates separately and distinctly from a user node (e.g., user 2404) and a processor node, processor 2422). Broker 2416 represents one or more brokers, or broker nodes, each processing blockchain instantiation requests received from user 2404 in step S2436. As each node 2402 joins blockchain network 2410, the particular node 2402 registers with registrar 2408 in step S2438. In some embodiments, registration step S2438 includes vetting and/or authentication substeps (not shown) to verify that the nodes are legitimate, authentic, and authorized.

In some embodiments, after user 2404 sends requests (e.g., step S2436) for new blockchains to broker 2406, broker 2406 may then validate each such request. In the exemplary embodiment, broker 2406 queries registrar 2408 for available processors 2422, and then creates consensus pool 2412 in step S2438. In this example, consensus pool 2412 includes a necessary minimum number of processors for the associated blockchain 2428, as well as at least one observer 2414. In some embodiments, processor(s) 2422 may be directed by broker 2406 to participate in new blockchains, or a negotiation process may be invoked to allow processors 2422 to choose. Once consensus pool 2412 is created (e.g. step S2438), and observer 2414 assigned there to, broker 2406 directs instantiation (FIG. 25, below) of new blockchain 2428, which resultantly creates a genesis transaction (e.g., genesis transaction 2302, FIG. 23), and subsequently a genesis block (e.g., genesis block 2304, FIG. 23).

Observer 2414 then monitors blockchain 2428, consensus pool 2412, and processor(s) 2422 in step S2440. In some embodiments, blockchain advertisement and/or addressing are managed by broker 2406 or observer 2414. Once blockchain 2428 is no longer needed (as determined by a requesting user 2404, or by another indicator, such as no new transactions in a unit of time), consensus pool 2412 may direct destruct unit 2416 to destroy blockchain 2428. Upon receiving such direction, destruct unit 2416 will invoke one or both of trash 2418, which results in complete erasure of blockchain 2428, and archive 2420, which results in storage of blockchain 2428 for propriety purposes.

In alternative embodiments, at least some portions of the architecture of virtualization 2400 may be realized by aggregating some of the individual elements therein. For example, registrar 2408, broker 2406, and observer 2414 may be consolidated into a single entity. These entities, whether taken alone or individually, implement one or more of the following processes—instantiation, join, observe, and termination—described further below with respect to FIGS. 25-28. Through these novel systems and methods, the present embodiments are advantageously capable of supporting multiple concurrent blockchains.

Figure 25:
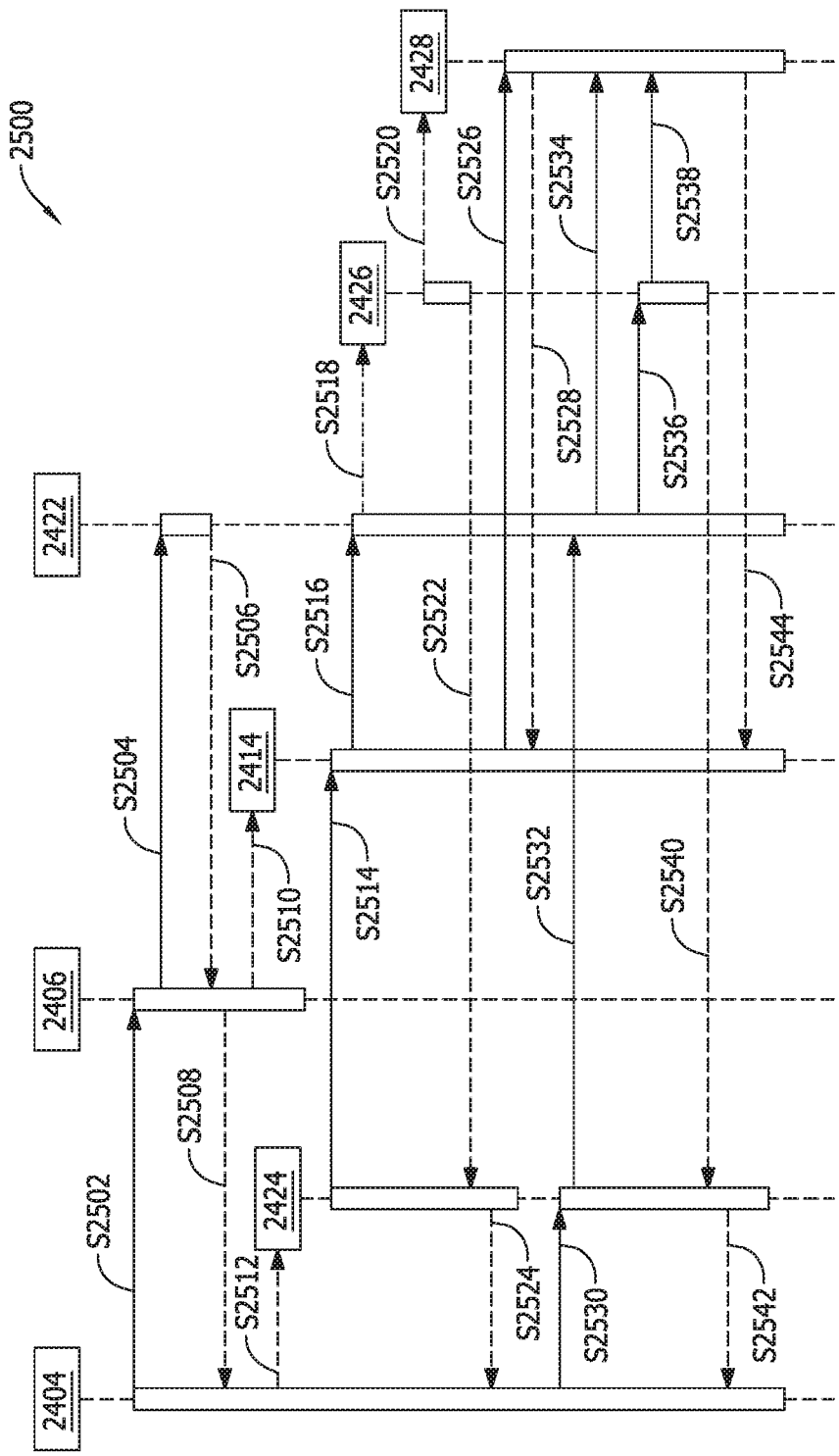
FIG. 25 is a sequence diagram illustrating an interaction with an exemplary blockchain instantiation process, according to an embodiment.

FIG. 25 is a sequence diagram illustrating an interaction with an exemplary blockchain instantiation process 2500. Blockchain instantiation can be the most involved process of blockchain virtualization. In some embodiments, instantiation process 2500 includes failure conditions, which are not illustrated in FIG. 25. Instantiation process 2500 is described with respect to the architecture of virtualization 2400, FIG. 24, and operates utilizing the same components described above. For ease of explanation, instantiation process 2500 is illustrated with the assumption that relay or aggregation nodes are not used, and that requested blockchain features and instantiation operate as normal. Other blockchain elements and processes not specifically described with respect to FIG. 25 can be assumed to operate as described above with respect to the several embodiments featured herein.

In operation, instantiation process 2500 may execute the following steps, which are not necessarily required to be in the order listed, except where so clearly designated as being dependent on a prior step. In step S2502, user 2404 sends a blockchain request, BCRequest, message, including a description of required features, to broker(s) 2406. In some embodiments, broker 2406 may know what processors 2422 are available based on information provided previously by registrar 2408. In alternative embodiments, in step S2504, a broadcast message, BCSolicitation, is sent from broker 2406 to the entire network of processors 2422. In step S2506, processor(s) 2422 evaluate the request and respond, such as with a BCSolicitationAccept message, according to their ability to satisfy the required features. In step S2508, if processor participation is sufficient to meet user request needs, user 2404 receives an accept message, BCAccept, which includes an identifier of blockchain 2428 (BCID), a list of participating processors 2422, and the corresponding observer 2414.

In step S2510, broker 2406 creates and/or sends a message, BCObserver, to observer 2414 regarding the sum of participating 2422 that become consensus pool 2412, which is then monitored by observer 2414, which monitors the blockchain status and reports to registrar 2408 (not shown in FIG. 25). In step S2512 user 2404, when ready, creates genesis transaction 2424, including the BCID. In step S2514, a genesis transaction message is sent to observer 2414. In some embodiments, the genesis transaction message includes one or more of the BCID, a sendID, and a receiveID. In step S2516, observer 2414 relays a broadcast message, e.g., BCInstantiate, to processor(s) 2422, which may include the BCID, the included processors, and user-specified features of the blockchain. In step S2518, processor(s) 2422 subsequently process block 2426 as the first, or genesis, block (e.g., genesis block 2304, FIG. 23), and in step S2520, create blockchain 2428.

Once blockchain 2428 is created, the following steps may be implemented for operation and management thereof. For example, in step S2522, block 2426 is confirmed for transaction 2424 and, in step S2524, the confirmation is received by user 2404. In some embodiments, these confirmations are passively observed by transaction 2424 and user 2404. In step S2526, observer 2414 monitors blockchain 2428 and, in step S2528, receives updates from blockchain 2428. In step S2530, user 2404 submits an additional transaction 2424 (e.g., transaction 2308, FIG. 23), including the BCID, which is then sent, in step S2532, to processor(s) 2422. Processor 2422 then validates the additional transaction in step S2534, creates a new block 2426 (e.g., block 2306, FIG. 23) in step S2536, which is then added to blockchain 2428 in step S2538. In step S2540, the additional block 2426 is confirmed for transaction 2424 and, in step S2542, the additional confirmation is received by user 2404. In some embodiments, as described above, these confirmations are passively observed by transaction 2424 and user 2404. In step S2544, observer 2414 monitors and receives updates from blockchain 2428.

Figure 26:
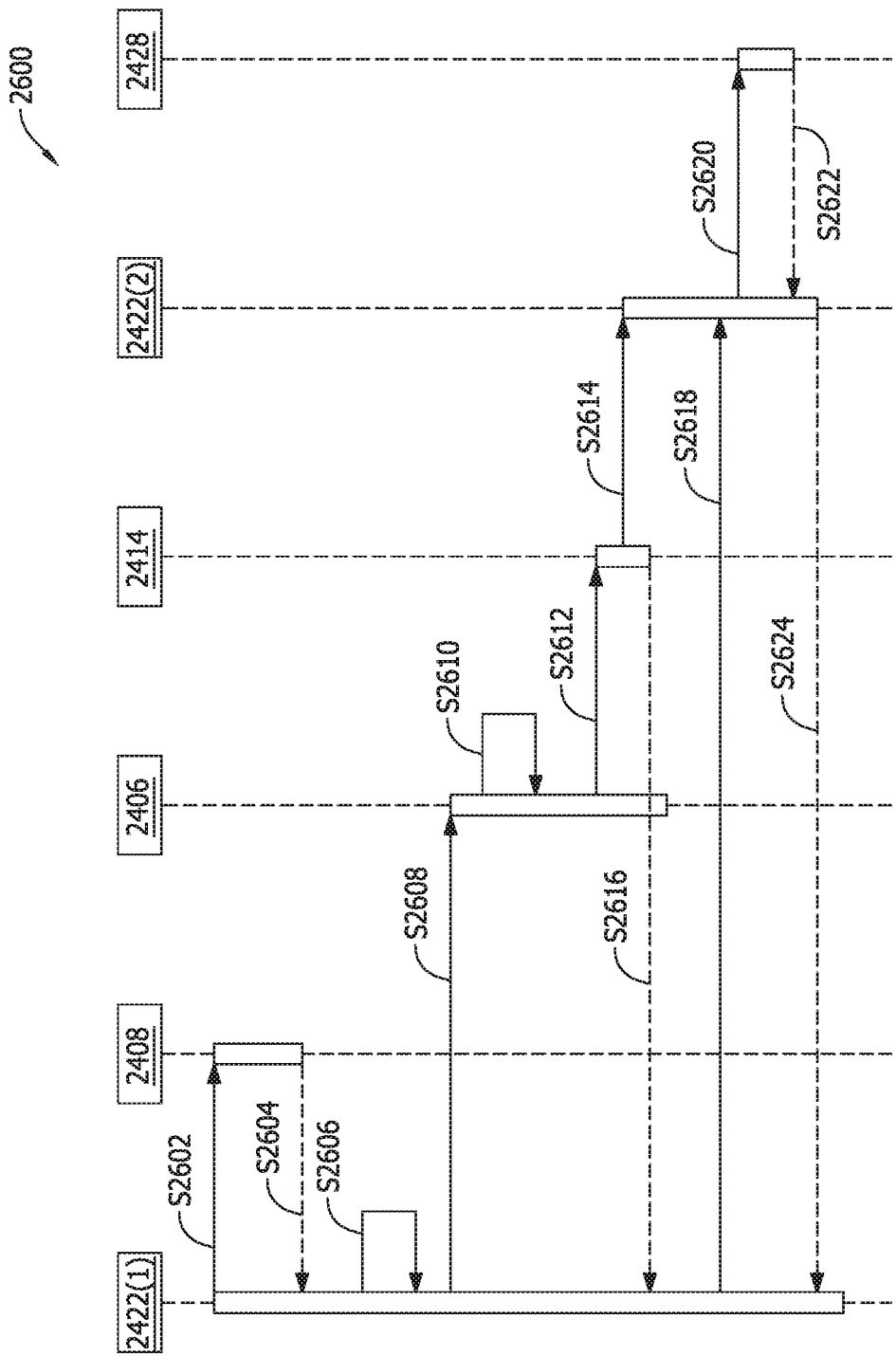
FIG. 26 is a sequence diagram illustrating an interaction with an exemplary blockchain join process, according to an embodiment.

FIG. 26 is a sequence diagram illustrating an interaction with an exemplary blockchain join process 2600. A processor (e.g., processor 2422) needs to join the blockchain forest network before the processor can participate in any blockchain processing. Additionally, once part of the network (e.g., network 2410), the processor may further want to join already existing blockchains, as opposed to a newly created blockchain. Join process 2600 advantageously allows processors to join either type of blockchain. In an exemplary embodiment, it is assumed that instances of objects necessary to operate the blockchain are already in existence, unless an instantiation process (e.g. instantiation process 2500, FIG. 25) is pending for a genesis transaction.

In operation, instantiation process 2600 may execute the following steps, which are not necessarily required to be in the order listed, except where so clearly designated as being dependent on a prior step. In step S2602, a first processor 2422(1) wishing to join the blockchain forest sends a request, e.g., BCListRequest, to registrar 2408. In step S2604, registrar 2408 stores first processor 2422(1) as a node and responds to the request, e.g., with a BCListResponse message. In an exemplary embodiment, the response message includes a list of existing blockchains and associated features, as indicated by a BCID. In step S2606, first processor 2422(1) uses the information provided by registrar 2408, and decides to join one or more new or existing blockchains (or none at all). In step S2608, first processor 2422(1) joins a chosen blockchain 2428 by sending a request, e.g., BCJoinRequest, to broker 2406 including a BCID for each chosen blockchain 2428.

In step S2610, broker 2406 decides to accept the join request and, in step S2612, advises observer 2414, e.g., by a BCObserver message, of the acceptance. In an exemplary embodiment, the acceptance message includes one or more of the BCID, the included processors, and user requested features for each joined blockchain 2428. Observer 2414, in step S2614, updates participating second processors 2422(2), and in step S2616, joining first processor 2422(1) of the join by, for example, a BCUpdate message. In step S2618, joining first processor 2422(1) notifies participating second processors 2422(2), e.g., by a CopyBC message, to receive the entirety of current blockchain 2428 to which it has joined. Second processors 2422(2), in step S2620, request a copy of the current blockchain 2428 and, in step S2622, receive a copy. In step S2624, first processor 2422(1) receives a download of the entirety of joined blockchain 2428 and, once the download is complete, first processor 2422(1) may begin processing blockchain transactions 2424 from user(s) 2404. Join process 2600 and then process additional transactions and blocks similarly to step S2522 et seq., FIG. 25.

Figure 27:
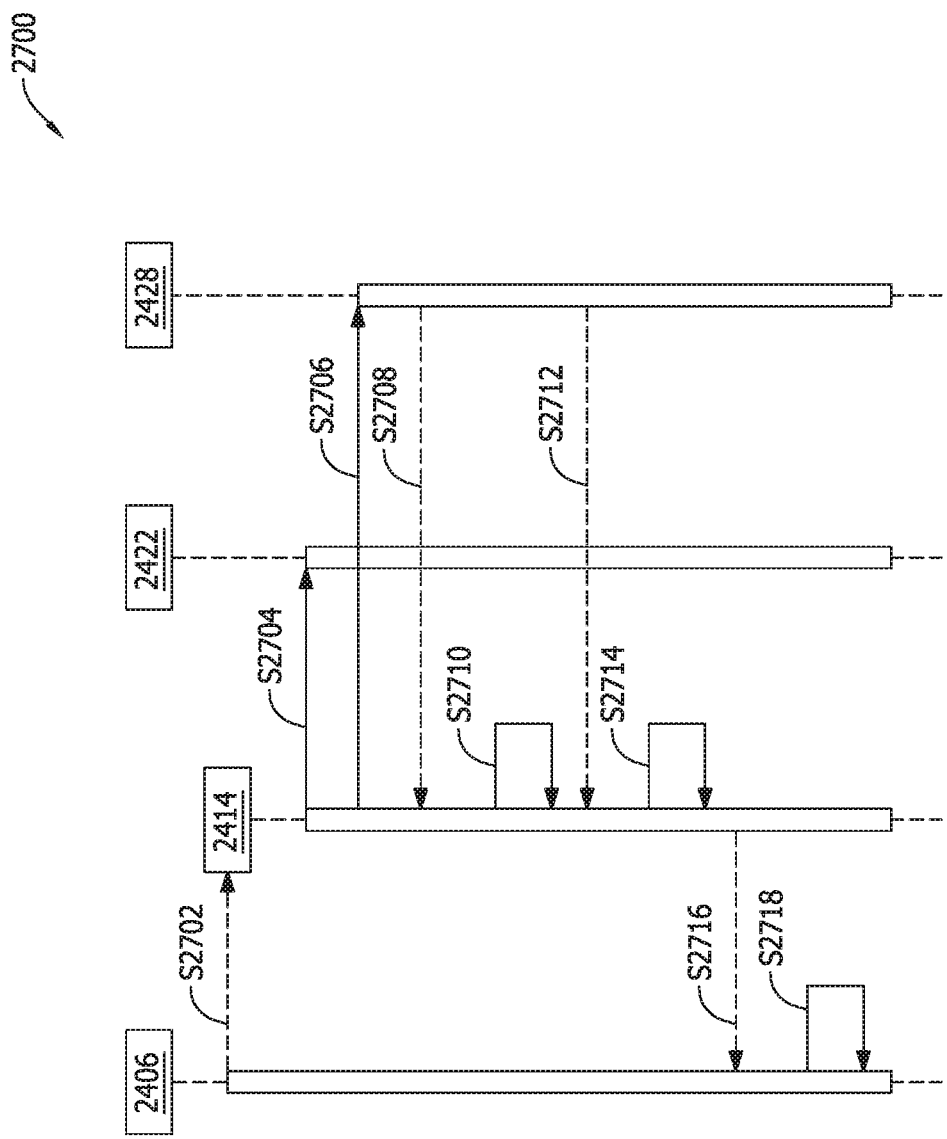
FIG. 27 is a sequence diagram illustrating an interaction with an exemplary blockchain observe process, according to an embodiment.

FIG. 27 is a sequence diagram illustrating an interaction with an exemplary blockchain observe process 2700. In operation, observe process 2700 may execute the following steps, which are not necessarily required to be in the order listed, except where so clearly designated as being dependent on a prior step. In step S2702, observer 241) is created or assigned by broker 2406 to monitor each created blockchain 2428 and, in step S2704, processor 2422 is so notified, and may receive from observer 2414, for example, the results of blockchain instantiation (e.g., instantiation process 2500, FIG. 25), including the BCID, included processors, and user requested features each blockchain 2428 being observed. In step S2706, observer 2414 observes blockchain 2428. In step S2708, observer 2414, in an exemplary embodiment, passively participates in the blockchain network (e.g., network 2410), such as by receiving BCUpdate messages, or the equivalent, from blockchain 2428 as if the observer was a processor.

Observer 2414 monitors blocks 2426 as they are created, and ensures that the processing network 2410 and consensus pool 2412 are correct and satisfy the original blockchain features specified by the requesting user 2404. For example, in step S2710, observer 2414 checks blockchain 2428 and, in step S2712, receives a BCUpdate message. In an exemplary embodiment, a blockchain check by observer 2414 includes tests to determine whether there are changes in the blockchain status, including, without limitation, one or more of a UTXO list, time bounding, or lack of blockchain updates from processor 2422. In step S2714, observer 2414 checks blockchain 2428 again and, if a problem or discrepancy is discovered, in step S2716, observer 2414 sends an alert, e.g., a BCStatusChange message, to broker 2406 for mediation. In step S2718, broker 2406 attempts to validate blockchain 2428 and, based on the validation, broker 2406 may choose to (i) rebuild consensus pool 2412, (ii) terminate blockchain 2428 (see FIG. 28, below), or (iii) take no action.

Figure 28:
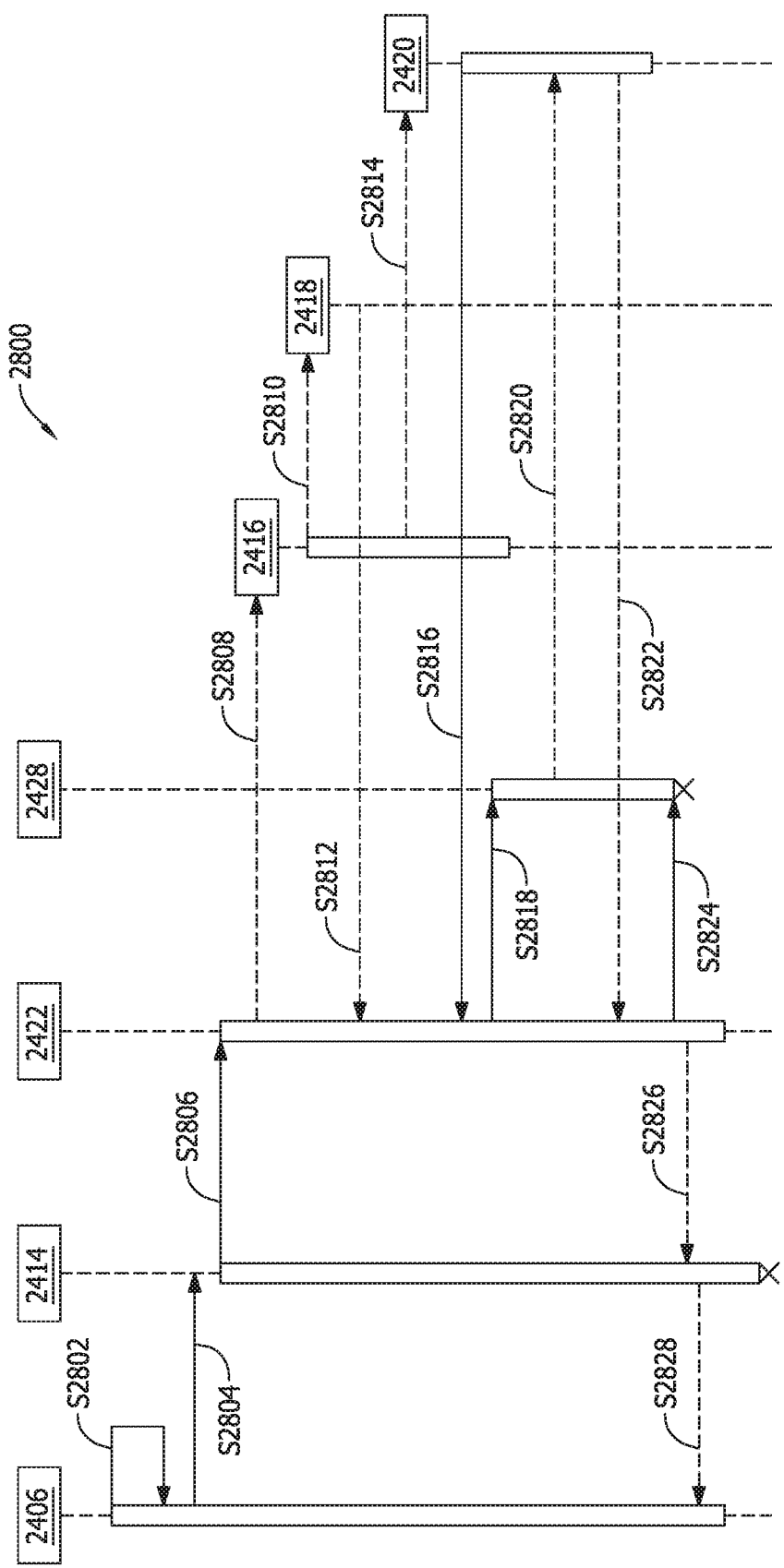
FIG. 28 is a sequence diagram illustrating an interaction with an exemplary blockchain termination process, according to an embodiment.

FIG. 28 is a sequence diagram illustrating an interaction with an exemplary blockchain termination process 2800. In theory, blockchains may exist for an unlimited duration. In practice, however, "eternal blockchains" are problematic. At some point in its existence, given blockchain may be corrupted, or no longer useful, and must be terminated. Termination process 2800 advantageously allows such blockchains to be destroyed. In operation, termination process 2800 may execute the following steps, which are not necessarily required to be in the order listed, except where so clearly designated as being dependent on a prior step.

In step S2802, broker 2406 attempts to validate blockchain 2428 (similar to step S2718, FIG. 27) and recognizes the need to terminate blockchain 2428. In step S2804, broker 2406 transmits a destruct message, including the BCID and a flag for trash 2418 or archive 2420, to observer 2414, which then relays the destruct message, in step S2806, to the consensus pool (e.g., consensus pool 2412) of processors 2422. Each processor will then, in step S2808, initiate destruct unit 2416 to either archive or delete blockchain 2428 according to the flag originally transmitted by broker 2406.

In FIG. 28, both of trash 2418 and archive 2420 outcomes are illustrated. In the exemplary embodiment, however, only one of the two outcomes will occur. For example, to delete blockchain 2428, in step S2810, destruct unit 2416 has trash 2418 destroy the blockchain and, in step S2812, an acknowledgment of the destruction is received by processor 2422. Alternatively, to archive blockchain 2428, in step S2814, destruct unit 2416 (which may reside in processor 2422 as a hardware or software component) forwards the destruct message to archive component 2420, which then, in step S2816, requests a copy of blockchain 2428 from processor 2422. In step S2818, processor 2422 copies blockchain 2428 and, in step S2820, forwards the copy of the blockchain 2428 to archive 2420. In step S2822, processor 2422 receives an acknowledgment that blockchain 2428 is archived and, in step S2824, deletes blockchain 2428. In step S2826, processor 2422 sends an acknowledgment of the deleted blockchain, e.g., a DestructAck message, to observer 2414. In step S2828, observer 2414 forwards the DestructAck message to broker 2406, and observer 2414 then terminates.

In the exemplary embodiments described above, blockchain virtualization is illustrated to be orchestrated and maintained using a registration model. Centralization achieved according to the registration model advantageously provides both stability and predictability to a blockchain ecosystem. In an alternative embodiment, a consensus model can be applied to the embodiments described above instead of the registration model, in order to provide additional security ecosystem. According to the consensus model alternative, registrar, broker, and observer roles (e.g., registrar 2408, broker 2406, and observer 2414, respectively) are integrated into processors (e.g., processor 2422). These integrated processors thereby are capable of negotiating participation and feature fulfilment operations collectively, utilizing either another blockchain (e.g., a management blockchain), or a consensus driven database (such as Cassandra).

The blockchain virtualization systems and methods described herein thus provide the ability to create, maintain, and destroy blockchains within a single blockchain infrastructure. The present embodiments therefore realize significant advantages over conventional monolithic blockchain architectures (i.e., one infrastructure per blockchain), and particularly with respect to security, scalability, optimization, and adaptability of the blockchain forest. For example, different use cases require different levels of security, but it monolithic architecture is not adaptable for different levels of security. Moreover, blockchains do not lend themselves to recovery in the event they are compromised or corrupted.

According to the embodiments described herein, on the other hand, blockchain virtualization allows users to request the security features they need in terms of, for example and without limitation, the minimum size of the consensus pool, location or geographic dispersion of processor physical locations, cryptographic algorithms, consensus mechanisms, and code bases. Conventional multichain blockchains provide users the ability to request some of these features, but only for creation of a single blockchain. In the event a blockchain or its transaction records are compromised, conventional blockchain systems do not allow for the destruction of the legacy chain and bootstrapping of a new blockchain. In contrast, the present blockchain virtualization systems and methods are advantageously able to reestablish security and/or terminate a blockchain that is no longer viable as the users migrate to a new solution.

In some embodiments, security of new blockchains may be improved by including a blockchain hash from another chain, either from within the blockchain forest, or from an independent blockchain (such as Bitcoin). The hash may be included as part of the archival process (e.g., archive 2420, FIG. 24), or can also be included prior to archival from within the lifecycle of a blockchain (e.g., FIG. 23). Accordingly, milestones of one blockchain may then be communicated and distributed to other blockchains as transactions. These new transactions can be performed at defined time intervals, at defined block heights (e.g., as part of instantiation and/or user request requirements), or associated with other activity within the blockchain forest (e.g., when another blockchain is instantiated or destroyed). This additional blockchain forest mechanism thus advantageously creates a lattice of blockchains that is more secure than conventional monolithic implementations because adversaries of the blockchain are now required to attack multiple blockchains to perform a history attack, for example.

According to the systems and methods described herein, the role of nodes and brokers in the blockchain forest may also include verification of both their blockchain, as well as other blockchains, in the forest against the recorded historical record of hashes stored in other chains. Under this structure, matching concerns might not necessarily indicate a problem with a blockchain being stored, but nevertheless might indicate tampering in other blockchains in the forest. Through this mechanism, consistency and/or parity of all blockchains in the forest are better supported through distribution and collaboration among the forest.

As described above, blockchain virtualization advantageously realizes the ability to create blockchains as necessary, and terminate such blockchains in a straightforward manner when they are no longer needed. In contrast, conventional monolithic blockchains have been known to grow in an unbounded manner. After years of operation, the height of such conventional blockchains, their number of unspent transactions, their network performance of the consensus pool, etc. have been seen to grow to the point that the blockchain does not perform well. Other blockchains may be less successful, and have a small number of participants. As described herein, blockchain virtualization allows conventional blockchains to operate collectively, with the ability to terminate those that are corrupted are no longer useful, while improving the security of blockchains having a smaller number of participants.

In conventional blockchain implementations, security and scalability improvements tend to result in trade-offs against performance. According to the systems and methods described herein, on the other hand, blockchain virtualization allows the forest to utilize only the resources needed to achieve particular security goals of a specific blockchain use case. By operating collectively in a blockchain forest, processors of many different types (e.g., CPU, GPU, FPGA, or ASIC-based processors, etc.) are able to advantageously participate as necessary to support blockchain implementations for which they are optimal (e.g., according to cryptographic computational complexity, consensus approach, etc.).

The systems and methods described herein also provide significant improvements over conventional implementations with regard to adaptability. For example, use of an observer process (e.g., observe process 2700, FIG. 27) advantageously allows the virtualization (e.g., virtualization 2400, FIG. 24) to grow or contract the consensus pool as needed. In some embodiments, the virtualization can even require increases or decreases to the consensus pool based on predetermined conditions. Additionally, the present blockchain virtualization embodiments provide an improved system/method of orchestrating a fork from or migration of the code base of a blockchain than is available to conventional implementations.

As described herein, blockchain virtualization can be achieved by an orchestration environment that advantageously enables multiple blockchains to run concurrently, that is, in parallel, on a single networked infrastructure. Such virtualization systems and methods thereby provide improved opportunities to optimize security, scalability, and performance to specific blockchain use cases. Processors in this improved blockchain forest may thus be particularly optimized to support such specific use cases, and achieve a more graceful experience through participation in one or more concurrent consensus groups.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A blockchain forest system for a blockchain network including a plurality of processing nodes, comprising:
    a plurality of individual blockchains, wherein each individual blockchain of the plurality of individual blockchains (i) is configured to operate independently from one or more other individual blockchains of the plurality of individual blockchains, and (ii) includes a blockchain height defined by a genesis block and at least one additional block;
    a blockchain forest width comprising a plurality of participating processors fewer than a number of processing nodes included in the plurality of processing nodes, wherein a number of participating processors defines a forest consensus pool having the blockchain forest width; and
    a blockchain forest height comprising a time-sequenced start-to-finish length of blocks among the collective plurality of individual blockchains,
    wherein at least one participating processor of the forest consensus pool is configured to aggregate a particular blockchain of the plurality of individual blockchains with different blockchains of the plurality of individual blockchains to operate concurrently among the forest consensus pool and within the time-sequenced start-to-finish length of blocks,
    wherein the at least one participating processor is further configured to delete, from the forest consensus pool, individual ones of plurality of individual blockchains within the time-sequenced start-to-finish length of blocks, thereby closing an entirety of a deleted individual blockchain to new transactions from the plurality of participating processors upon deletion of the deleted individual blockchain,
    wherein each genesis block of the plurality of individual blockchains occurs within the time-sequenced start-to-finish length of blocks of the blockchain forest height,
    wherein the plurality of participating processors in the forest consensus are decoupled from one another,
    wherein each participating processor of the forest consensus pool is configured to conform with a common set of predefined security consensus pool characteristics, and wherein the forest consensus pool is configured to (i) receive a genesis transaction for each genesis block as a first submission of a new individual blockchain for participation in the blockchain forest system, (ii) coordinate, through a consensus participation protocol, creation of the new individual blockchain within the blockchain forest system, and (iii) manage continued participation of the new individual blockchain, according the consensus participation protocol, within the blockchain forest height of the blockchain forest system.

2. The system of claim 1, wherein the at least one participating processor is configured to implement a registration model.

3. The system of claim 2, wherein the at least one participating processor is in operable communication with a first node configured to one or more of (i) maintain a list of nodes in the blockchain forest system, and (ii) represent a discovery protocol.

4. The system of claim 2, wherein the at least one participating processor is in operable communication with a broker node configured to perform one or more of (i) processing blockchain instantiation transactions, and (ii) managing or arbitrating the individual blockchains of the collective plurality of individual blockchains.

5. The system of claim 2, wherein the at least one participating processor is in operable communication with an observer node configured to one or more of maintaining a state of each individual blockchain of the collective plurality of individual blockchains and signal the forest system when one of the individual blockchains changes or is no longer needed.

6. The system of claim 5, wherein the observer node is further configured to monitor each individual blockchain of the collective plurality of individual blockchains and notify a broker node of a change in status of one or more of the individual blockchains.

7. The system of claim 1, wherein the at least one participating processor is configured to implement a consensus model.

8. The system of claim 7, further comprising a registrar node, a broker node, and an observer node integrated within a single one of the plurality of participating processors.

9. The system of claim 1, further comprising a destruct unit configured to execute a trash operation to erase and/or terminate at least one of the individual blockchains from the forest consensus pool, from the genesis block of the individual blockchain to a last transaction recorded on the individual blockchain, as a trashed blockchain.

10. The system of claim 9, wherein the destruct unit is further configured to execute an archival subprocess for the trashed blockchain to store the trashed blockchain in an archival storage location.

11. The system of claim 10, wherein the destruct unit is further configured to receive, from the forest consensus pool, confirmation of (i) an evaluation of the trashed blockchain, (ii) a verification of an entirety of the trashed blockchain by computational hashing, and (iii) an agreement as to the final state of the trashed blockchain.

12. The system of claim 11, wherein the destruct unit is further configured to communicate the archival storage location of the trashed blockchain to all other blockchains of the plurality of individual blockchains in the blockchain forest system.

13. The system of claim 1, wherein the at least one participating processor is further configured to instantiate a new blockchain upon receipt of a blockchain request from a user node.

14. The system of claim 1, wherein the forest consensus pool is configured to allow a requesting processor to join the plurality of participating processors upon request from the requesting processor.

15. The system of claim 1, wherein the plurality of participating processors is further configured to negotiate the time-sequenced start-to-finish length of blocks for the collective plurality of individual blockchains.

16. The system of claim 1, wherein the plurality of participating processors is further configured to (i) define a set of security requirements common to the forest consensus pool, and (ii) manage the creation, participation, and termination of an entirety of each individual blockchain of the collective plurality of individual blockchains.

* * * * *